US012720398B2

(12) United States Patent
Eklöf et al.

(10) Patent No.: US 12,720,398 B2
(45) Date of Patent: Aug. 25, 2026

(54) SOURCE SECONDARY NODE (S—SN) INITIATED CANCELLATION OF CONDITIONAL PSCELL CHANGE (CPC) IN A MULTI-RADIO DUAL-CONNECTIVITY (MR-DC) SYSTEM

(71) Applicant: Telefonaktiebolaget LM Ericsson (publ), Stockholm (SE)

(72) Inventors: Cecilia Eklöf, Täby (SE); Icaro Leonardo Da Silva, Solna (SE); Julien Muller, Rennes (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 451 days.

(21) Appl. No.: 18/030,306

(22) PCT Filed: Oct. 5, 2021

(86) PCT No.: PCT/IB2021/059132
§ 371 (c)(1),
(2) Date: Apr. 5, 2023

(87) PCT Pub. No.: WO2022/074564
PCT Pub. Date: Apr. 14, 2022

(65) Prior Publication Data

US 2023/0379788 A1 Nov. 23, 2023

Related U.S. Application Data

(60) Provisional application No. 63/089,946, filed on Oct. 9, 2020.

(51) Int. Cl.

| | |
|---|---|
| ***H04W 36/36*** | (2009.01) |
| ***H04W 36/00*** | (2009.01) |
| ***H04W 76/30*** | (2018.01) |

(52) U.S. Cl.
CPC ......... *H04W 36/362* (2023.05); *H04W 76/30* (2018.02); *H04W 36/00698* (2023.05)

(58) Field of Classification Search
CPC ............... H04W 36/362; H04W 76/30; H04W 36/00698; H04W 76/15; H04W 88/06; H04L 5/0055; H04L 5/0094; H04L 5/001
See application file for complete search history.

(56) References Cited

U.S. PATENT DOCUMENTS

| | | | | |
|---|---|---|---|---|
| 2021/0258843 | A1* | 8/2021 | Awada .................. | H04W 48/08 |
| 2021/0258852 | A1* | 8/2021 | Selvaganapathy .. | H04W 36/305 |

(Continued)

FOREIGN PATENT DOCUMENTS

| | | | |
|---|---|---|---|
| WO | 2022/029727 | A1 | 2/2022 |
| WO | 2022/064469 | A1 | 3/2022 |

OTHER PUBLICATIONS

International Search Report and Written Opinion issued in International Application No. PCT/IB2021/059132 dated Jan. 24, 2022 (25 pages).

(Continued)

*Primary Examiner* — Habte Mered
(74) *Attorney, Agent, or Firm* — Rothwell, Figg, Ernst & Manbeck, P.C.

(57) ABSTRACT

The invention concerns MR-DC (multi-radio dual connectivity) in which a UE is connected to a master node (MN) and secondary nodes (SN). In a Conditional PSCell Change (CPC)—i.e. a PSCell Change which is executed by the UE when an execution condition is met—a source secondary node, S-SN, may send a cancellation indication to a master node, MN, when said S-SN desires cancellation of a CPC configuration. Subsequently, the MN transmits a cancellation indication to the target candidate SNs configured with CPC.

6 Claims, 24 Drawing Sheets

(56) References Cited

U.S. PATENT DOCUMENTS

| | | | | |
|---|---|---|---|---|
| 2021/0337449 | A1* | 10/2021 | Zhu | H04L 5/0098 |
| 2022/0394578 | A1* | 12/2022 | Wu | H04W 36/0061 |
| 2023/0035119 | A1* | 2/2023 | Yang | H04W 36/0064 |
| 2023/0097891 | A1* | 3/2023 | Zhang | H04W 36/00837 370/331 |
| 2023/0111427 | A1* | 4/2023 | Zhang | H04W 16/26 370/331 |
| 2023/0171652 | A1* | 6/2023 | Zhang | H04W 36/362 370/331 |
| 2023/0370909 | A1* | 11/2023 | Deng | H04W 36/0069 |
| 2023/0388871 | A1* | 11/2023 | Guo | H04W 36/0069 |

OTHER PUBLICATIONS

Qualcomm Incorporated, "Conditional PSCell addition/change", 3GPP TSG-RAN WG2 Meeting #111-e, R2-2007749, E-meeting, Aug. 17-28, 2020 (8 pages).

ZTE, "TP for BLCR for TS 36.423 Conditional PScell&SCG Cancel in EN-DC", 3GPP TSG RAN WG3#105bis, R3-195117, Chongqing, China, Oct. 14-18, 2019 (10 pages).

3GPP TS 37.340 V16.3.0 (Sep. 2020), 3rd Generation Partnership Project; Technical Specification Group Radio Acces Network; Evolved Universal Terrestrial Radio Access (E-UTRA) and NR; Multi-connectivity; Stage 2 (Release 16), Sep. 2020 (83 pages).

Huawei, "Revised WID on Further Multi-RAT Dual-Connectivity enhancements", 3GPP TSG RAN Meeting #88e, RP-201040, Electronic Meeting, Jun. 29-Jul. 3, 2020 (4 pages).

3GPP TS 38.423 V16.3.0 (Sep. 2020), 3rd Generation Partnership Project; Technical Specification Group Radio Access Network; NG-RAN; Xn application protocol (XnAP) (Release 16), Sep. 2020 (451 pages).

3GPP TS 38.331 V15.10.0 (Jul. 2020), 3rd Generation Partnership Project; Technical Specification Group Radio Access Network; NR; Radio Resource Control (RRC) protocol specification (Release 15), Jul. 2020 (539 pages).

3GPP TS 38.300 V16.3.0 (Sep. 2020), 3rd Generation Partnership Project; Technical Specification Group Radio Access Network; NR; NR and NG-RAN Overall Description; Stage 2 (Release 16), Sep. 2020 (148 pages).

* cited by examiner

SOURCE SECONDARY NODE (S—SN) INITIATED CANCELLATION OF CONDITIONAL PSCELL CHANGE (CPC) IN A MULTI-RADIO DUAL-CONNECTIVITY (MR-DC) SYSTEM

CROSS REFERENCE TO RELATED APPLICATIONS

This application is a 35 U.S.C. § 371 National Stage of International Patent Application No. PCT/IB2021/059132, filed 2021 Oct. 5, which claims priority to U.S. provisional patent application No. 63/089,946, filed on 2020 Oct. 9, which is incorporated by this reference.

TECHNICAL FIELD

This disclosure relates to cancellation of a conditional Primary Secondary-Cell (PSCell) change.

BACKGROUND

Conditional Handover (CHO)

Two new work items for mobility enhancements in LTE and NR have started in 3GPP in release 16. The main objectives of the work items are to improve the robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the UE are already quite bad. That may lead to that the HO Command may not reach the UE in time if the message is segmented or there are retransmissions.

In LTE and NR, different solutions to increase mobility robustness have been discussed in the past. One solution discussed in NR is called "conditional handover" or "early handover command." In order to avoid the undesired dependence on the serving radio link upon the time (and radio conditions) where the UE should execute the handover, the possibility to provide RRC signaling for the handover to the UE earlier should be provided. To achieve this, it should be possible to associate the HO command with a condition for example based on radio conditions possibly similar to the ones associated with an A3 event, where a given neighbour becomes X db better than target. As soon as the condition is fulfilled, the UE executes the handover in accordance with the provided handover command.

Such a condition could, for example, be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold), which is considered optimal for the handover execution.

FIG. 1 depicts a serving and a target cell. In practice there may often be many cells or beams that the UE reported as possible candidates based on its preceding RRM measurements. The network should then have the freedom to issue conditional handover commands for several of those candidates. The RRCConnectionReconfiguration for each of those candidates may differ for example in terms of the HO execution condition (RS to measure and threshold to exceed) as well as in terms of the RA preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

Conditional handover is described in stage 2, TS 38.300 in chapter 9.2.3.4., a portion of which is reproduced below:

TS 38.300 Chapter 9.2.3.4

9.2.3.4 Conditional Handover 9.2.3.4.1 General

A Conditional Handover (CHO) is defined as a handover that is executed by the UE when one or more handover execution conditions are met. The UE starts evaluating the execution condition(s) upon receiving the CHO configuration, and stops evaluating the execution condition(s) once the execution condition(s) is met.

The following principles apply to CHO:

1. The CHO configuration contains the configuration of CHO candidate cell(s) generated by the candidate gNB (s) and execution condition(s) generated by the source gNB.
2. An execution condition may consist of one or two trigger condition(s) (CHO events A3/A5, as defined in [12]). Only a single RS type is supported and at most two different trigger quantities (e.g. RSRP and RSRQ, RSRP and SINR, etc.) can be configured simultaneously for the evaluation of CHO execution condition of a single candidate cell.
3. Before any CHO execution condition is satisfied, upon reception of HO command (without CHO configuration), the UE executes the HO procedure as described in clause 9.2.3.2, regardless of any previously received CHO configuration.
4. While executing CHO, i.e. from the time when the UE starts synchronization with target cell, UE does not monitor source cell.

9.2.3.4.2 C-Plane Handling

As in intra-NR RAN handover, in intra-NR RAN CHO, the preparation and execution phase of the conditional handover procedure is performed without involvement of the 5GC; i.e. preparation messages are directly exchanged between gNBs. The release of the resources at the source gNB during the conditional handover completion phase is triggered by the target gNB. FIG. 2 depicts the basic conditional handover scenario where neither the AMF nor the UPF changes.

0/1. Same as step 0, 1 in FIG. 9.2.3.2.1-1 of section 9.2.3.2.1.
2. The source gNB decides to use CHO.
3. The source gNB issues a Handover Request message to one or more candidate gNBs.
4. Same as step 4 in FIG. 9.2.3.2.1-1 of section 9.2.3.2.1.
5. The candidate gNB sends HANDOVER REQUEST ACKNOWLEDGE message including configuration of CHO candidate cell to the source gNB.
6. The source gNB sends an RRCReconfiguration message to the UE, containing the configuration of CHO candidate cell(s) and CHO execution condition(s).
7. UE sends an RRCReconfigurationComplete message to the source gNB.

8. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell, synchronises to that candidate cell and completes the RRC handover procedure by sending RRCReconfigurationComplete message to the target gNB. The UE releases stored CHO configurations after successful completion of RRC handover procedure.

End TS 38.300 Chapter 9.2.3.4

Cancellation in Conditional Handover

In 3GPP rel-16, the possibility for a candidate target node for conditional handover to cancel one or multiple candidate target cells already prepared for a CHO has been standardized. A new Conditional Handover Cancel procedure was added to 3GPP TS 38.423, a portion of which is reproduced below:

8.2.9.1 General

The Conditional Handover Cancel procedure is used to enable a target NG-RAN node to cancel an already prepared conditional handover. The procedure uses UE-associated signalling.

The target NG-RAN node initiates the procedure by sending the CONDITIONAL HANDOVER CANCEL message to the source NG-RAN node. The target NG-RAN node shall indicate the reason for cancelling the conditional handover by means of an appropriate cause value. At the reception of the CONDITIONAL HANDOVER CANCEL message, the source NG-RAN node shall consider that the target NG-RAN node is about to remove any reference to, and release any resources previously reserved for candidate cells associated to the UE-associated signalling identified by the Source NG-RAN node UE XnAP ID IE and the Target NG-RAN node UE XnAP ID IE. If the Candidate Cells To Be Cancelled List IE is included in CONDITIONAL HANDOVER CANCEL message, the source NG-RAN node shall consider that only the resources reserved for the cells identified by the included NG-RAN CGI are about to be released.

8.2.9.3 Unsuccessful Operation

Not applicable.

8.2.9.4 Abnormal Conditions

If the CONDITIONAL HANDOVER CANCEL message refers to a context that does not exist, the source NG-RAN node shall ignore the message.

If one or more candidate cells in the Candidate Cells To Be Cancelled List IE included in the CONDITIONAL HANDOVER CANCEL message were not prepared using the same UE-associated signaling connection, the source NG-RAN node shall ignore those non-associated candidate cells.

End 3GPP TS 38.423

PSCell Change

The UE can be configured with Dual Connectivity, communicating both via an MCG (Master Cell Group) and an SCG (Secondary Cell Group). When the UE is configured with dual connectivity, the UE is configured with two MAC entities: one MAC entity for the MCG and one MAC entity for the SCG. In Multi-Radio Dual Connectivity (MR-DC) the cell groups are located in two different logical nodes, i.e. different NG-RAN nodes, possibly connected via a non-ideal backhaul, one providing NR access and the other one providing either E-UTRA or NR access. One node acts as the MN (Master Node) and the other as the SN (Secondary Node). The MN and SN are connected via a network interface and at least the MN is connected to the core network.

The operation in MR-DC involves different reconfiguration procedures, like secondary node addition, secondary node modification, secondary node release and secondary node change.

FIG. 3 shows the signalling flow from TS 37.340 for the SN initiated SN change, also called PSCell Change (PC). Therein, the UE is operating in MR-DC i.e. connected to an MN and a Source SN (S-SN) and, S-SN decides to move the UE to a target candidate SN (or target SN (T-SN) for short), possibly based on reported measurements on S-SN and/or T-SN frequencies. The steps shown in FIG. 3 are described below.

1. The S-SN initiates the SN change procedure by sending SgNB Change Required message which contains T-SN ID information and may include the SCG configuration (to support delta configuration) and measurement results related to the T-SN.

2/3. The MN requests the T-SN to allocate resources for the UE by means of the SgNB Addition procedure, including the measurement results related to the T-SN received from the S-SN. If forwarding is needed, the T-SN provides forwarding addresses to the MN. The T-SN includes the indication of the full or delta RRC configuration.

4/5. The MN triggers the UE to apply the new configuration. The MN indicates the new configuration to the UE in the RRCConnectionReconfiguration message including the NR RRC configuration message generated by the T-SN. The UE applies the new configuration and sends the RRCConnectionReconfigurationComplete message, including the encoded NR RRC response message for the T-SN, if needed. In case the UE is unable to comply with (part of) the configuration included in the RRCConnectionReconfiguration message, it performs the reconfiguration failure procedure.

6. If the allocation of T-SN resources was successful, the MN confirms the release of the S-SN resources. If data forwarding is needed the MN provides data forwarding addresses to the S-SN. If direct data forwarding is used for SN terminated bearers, the MN provides data forwarding addresses as received from the T-SN to S-SN. Reception of the SgNB Change Confirm message triggers the S-SN to stop providing user data to the UE and, if applicable, to start data forwarding.

7. If the RRC connection reconfiguration procedure was successful, the MN informs the T-SN via SgNB Reconfiguration Complete message with the encoded NR RRC response message for the T-SN, if received from the UE.

8. The UE synchronizes to the T-SN.

9. For SN terminated bearers using RLC AM, the S-SN sends the SN Status Transfer, which the MN sends then to the T-SN, if needed.

10. If applicable, data forwarding from the S-SN takes place. It may be initiated as early as the S-SN receives the SgNB Change Confirm message from the MN.

11. The S-SN sends the Secondary RAT Data Usage Report message to the MN and includes the data volumes delivered to and received from the UE over the NR radio for the related E-RABs.

NOTE 4: The order the S-SN sends the Secondary RAT Data Usage Report message and performs data forwarding with MN/T-SN is not defined. The SgNB may send the report when the transmission of the related bearer is stopped.

12-16. If applicable, a path update is triggered by the MN.

17. Upon reception of the UE Context Release message, the S-SN releases radio and C-plane related resources associated to the UE context. Any ongoing data forwarding may continue.

Conditional PSCell Change (CPC)

A solution for Conditional PSCell Change (CPC) procedure was standardized in Rel-16. Therein a UE operating in Multi-Radio Dual Connectivity (MR-DC) receives in a conditional reconfiguration one or multiple RRC Reconfiguration(s) (e.g., an RRCReconfiguration message) containing an SCG configuration (e.g., an secondaryCellGroup of IE CellGroupConfig) with a reconfigurationWithSync that is stored and associated with an execution condition (e.g., a condition like an A3/A5 event configuration), so that one of the stored messages is only applied upon the fulfilment of the execution condition; for example associated with the serving PSCell, upon which the UE would perform PSCell change (in case it finds a neighbour cell that is better than the current SpCell of the SCG).

The following principles apply to CPC:

1. The CPC configuration contains the configuration of CPC candidate cell(s) and execution condition(s) generated by the SN.
2. An execution condition may consist of one or two trigger conditions (CPC events A3/A5, as defined in RRC specifications). Only single RS type is supported and at most two different trigger quantities (e.g. RSRP and RSRQ, RSRP and SINR, etc.) can be configured simultaneously for the evaluation of CPC execution condition of a single candidate PSCell.
3. Before any CPC execution condition is satisfied, upon reception of PSCell change command or PCell change command, the UE executes the PSCell change procedure or the PCell change procedure, regardless of any previously received CPC configuration. Upon the successful completion of PSCell change procedure or PCell change procedure, the UE releases all stored CPC configurations.
4. While executing CPC, the UE is not required to continue evaluating the execution condition of other candidate PSCell(s).
5. Once the CPC procedure is executed successfully, the UE releases all stored CPC configurations.
6. Upon the release of SCG, the UE releases the stored CPC configurations.

In Rel-16, CPC was limited to intra-node CPC i.e. for a UE configured with MR-DC, the SN determines to configure CPC and provides a CPC configuration to the UE (e.g. via the MN), but the target candidate PSCell is a cell that is also associated to the same SN i.e. both source PSCell and target candidate PSCell(s) are associated to the S-SN. Also, only an SN-initiated CPC with or without MN involvement is supported. FIG. 4 illustrates SN initiated SN Modification without MN involvement.

In this case CPC is configured at the UE by modifying the SCG configuration via SRB3, so the SN initiated modification without MN involved procedure is used, as shown above. The SN can decide whether the Random Access procedure is required. Some of the steps shown in FIG. 4 are described below.

1. The SN sends the RRCReconfiguration message to the UE through SRB3. The UE applies the new configuration. For CPC that contains the IE ConditionalReconfiguration, which is part of the SCG Configuration and includes an RRCReconfiguration to be stored, per target candidate PSCell, and a condition configuration (on or two measId(s) pointing to a measurement configuration).

3a. In case of CPC, the UE maintains connection with source PSCell after receiving CPC configuration, and starts evaluating the CPC execution conditions for candidate PSCell(s). If at least one CPC candidate PSCell satisfies the corresponding CPC execution condition, the UE detaches from the source PSCell, applies the stored corresponding configuration for the selected candidate PSCell and synchronises to that candidate PSCell.

The UE completes the CPC execution procedure by sending an RRCReconfigurationComplete message to the new PSCell if the SRB3 is configured.

FIG. 5 illustrates transfer of an NR RRC message to/from the UE (when SRB3 is not used).

This procedure is used in case SRB3 is not configured. The SN initiates the procedure when it needs to transfer an NR RRC message to the UE and SRB3 is not used; and, in this particular case, the configuration contains an NR SCG RRCReconfiguration including the IE ConditionalReconfiguration, which is part of the SCG Configuration and includes an RRCReconfiguration to be stored, per target candidate PSCell, and a condition configuration (on or two measId(s) pointing to a measurement configuration). The steps shown in FIG. 5 are described below.

1. The SN initiates the procedure by sending the SgNB Modification Required to the MN.
2. The MN forwards the NR RRC message to the UE in the RRCConnectionReconfiguration message.
3. The UE applies the new configuration and replies with the RRCConnectionReconfigurationComplete message.

3a. If CPC is configured in the RRCConnectionReconfiguration, the UE maintains the connection with source PSCell after receiving the CPC configuration, and starts evaluating the CPC execution conditions for candidate PSCell(s). If at least one CPC candidate PSCell satisfies the corresponding CPC execution condition, the UE detaches from the source PSCell, applies the stored corresponding configuration for the selected candidate PSCell and synchronises to that candidate PSCell. The UE completes the CPC execution procedure by sending an ULInformationTransferMRDC message to the MN which includes an embedded RRCReconfiguration-Complete message to the new PSCell.

4. The MN forwards the NR RRC response message, if received from the UE, to the SN in the SgNB Modification Confirm message.
5. If instructed, the UE performs synchronisation towards the PSCell of the SN as described in SgNB Addition procedure. Otherwise the UE may perform UL transmission after having applied the new configuration.

In rel-16 CPC will be supported, but in rel-17 also PSCell Addition will be included, i.e., Conditional PSCell Addition/Change (CPAC). In rel-16 only intra-SN CPC without MN involvement is standardized. Inter SN PSCell CPC and CPC with MN involvement will be included in rel-17.

As described above, in rel-16 only intra-SN case without MN involvement for CPC is supported, i.e., where S-SN and T-SN are the same node in picture 10.5.1-2 from TS 37.340.

That means that the cell is changed, but both the old and the new cell are in the same node.

SUMMARY

A problem that the disclosure addresses relates to a new scenario to be supported in Rel-17, which is when a UE is operating in Multi-Radio Dual Connectivity (MR-DC), i.e., having a connection with a Master Node (MN) and a Secondary Node (SN), and the UE is configured with an inter-SN, SN initiated Conditional PSCell Change (CPC), i.e. when at least one target candidate PSCell in CPC is associated with a target candidate SN (T-SN) that is not the same node as the source SN (S-SN) to which the UE is connected. In existing solutions, there is no possibility for the target candidate SN or the S-SN to cancel one or multiple candidate PSCells. In the existing standard, there is no signalling and associated procedures supporting inter-SN, MN initiated Conditional PSCell Change (CPC).

Accordingly, certain challenges presently exist. That is, for example, there is currently no possibility for the S-SN to cancel one or multiple candidate PSCells. Methods for an MN to cancel a previously configured Conditional PSCell Addition (CPA) have been described, but the difference with this case for CPC is that at least three nodes are involved, the S-SN, the MN, and a target candidate SN (at least one). There is currently no possibility for the S-SN to cancel CPC.

The problem when three nodes are involved is that it is the target candidate SN that reserves resources for a UE that may later perform conditional PSCell change from the S-SN towards that target candidate SN. The target candidate SN reserves resources such as C-RNTI, RACH (in case of contention free RACH is configured), transmission power, bandwidth, and make sure the services/bearers the UE is running are supported in target with a minimum QoS, etc. for the UE, but it has no knowledge about the current UE behavior as the UE still resides in the S-SN.

If the S-SN identifies that the UE is, for example, moving away from the candidate target cell or has performed CPC to a cell in a different SN, the S-SN currently has no possibility to inform the T-SN that it may release the resources for the UE.

Such a problem is specific for CPC and does not exist in conventional PSCell change. The reason is that in legacy, when PSCell is prepared, the UE is expected to access the PScell within a short time whereas in CPC, as explained above, the UE may come some time later or not come.

Accordingly, in one aspect there is provided a method performed by an MN for cancellation of a CPC. The method includes transmitting to a T-SN a request for a CPC configuration. The method also includes receiving a response to the request. The method further includes receiving a cancellation indication transmitted by a S-SN, the cancellation indication indicating that the CPC configuration is to be cancelled.

In another aspect there is provided a method performed by a S-SN for cancellation of a CPC. The method includes the S-SN transmitting a cancellation indication to a master node indicating that a CPC is to be cancelled.

In another aspect there is provided a method performed by a T-SN for cancellation of a CPC. The method includes the T-SN receiving a request transmitted by an MN to prepare a CPC configuration. The method also includes transmitting to the MN a response to the request. The method further includes receiving a cancellation indication transmitted by the MN, the cancellation indication indicating that the CPC configuration is to be cancelled.

In another aspect there is provided a computer program comprising instructions which when executed by processing circuitry of a network node causes the network node to perform any of the methods disclosed herein. In one embodiment, there is provided a carrier containing the computer program wherein the carrier is one of an electronic signal, an optical signal, a radio signal, and a computer readable storage medium.

In another aspect there is provided a network node that is configured to perform the methods disclosed herein. The network node may include memory and processing circuitry coupled to the memory.

The various embodiments described herein address one or more of the issues disclosed herein. The embodiments may provide one or more of the following technical advantage(s). Certain embodiments make it possible for the S-SN to cancel a previously configured conditional PSCell Change towards an SN target candidate, e.g., if the UE has moved away from the target candidate cell, if the source wants to release a UE, or in case the UE has executed CPC to another target candidate.

DETAILED DESCRIPTION

Figure 1:
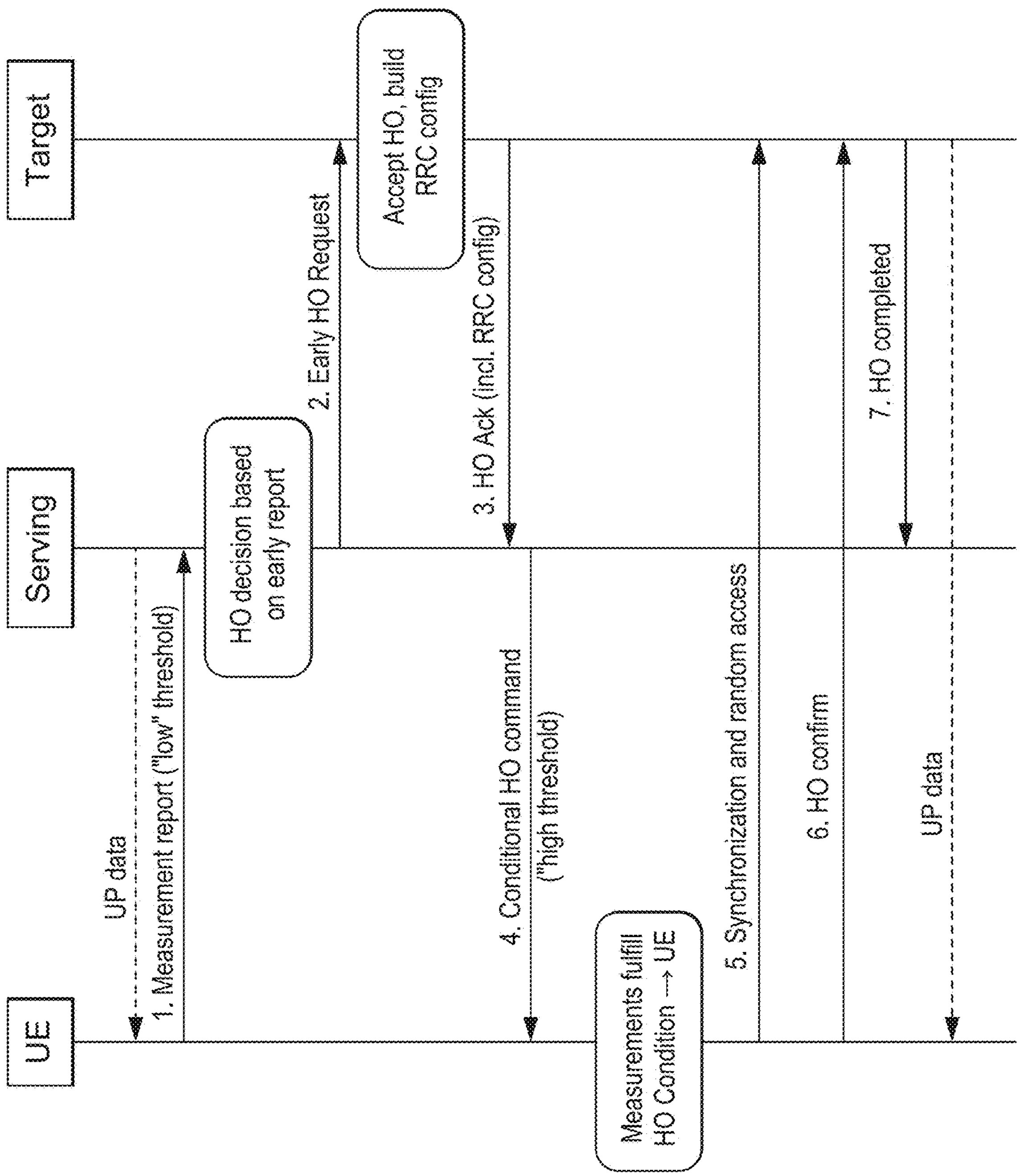
FIG. 1 depicts a serving and a target cell.
Figure 2:
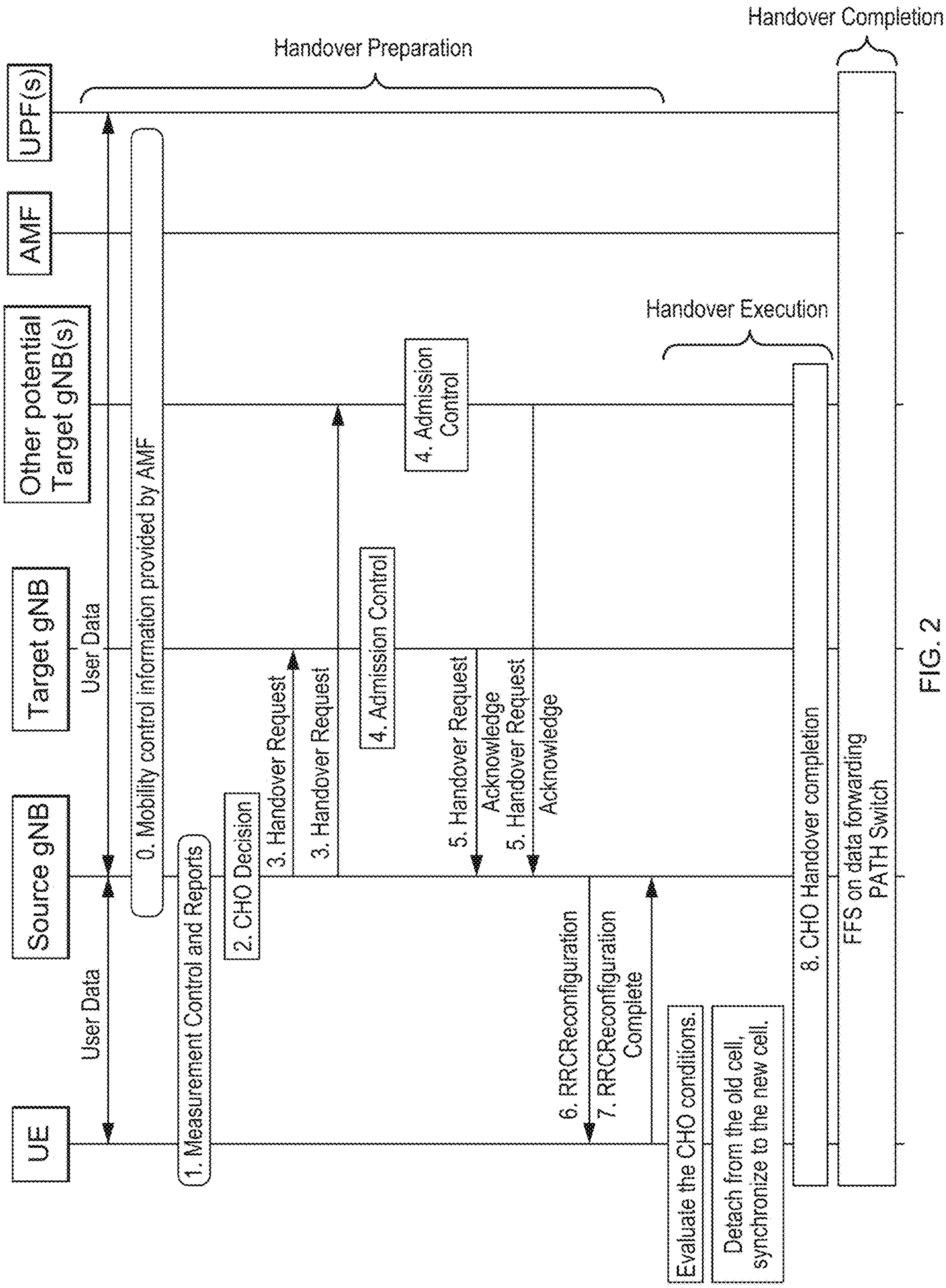
FIGS. 2-5 are a message flow diagrams.
Figure 3:
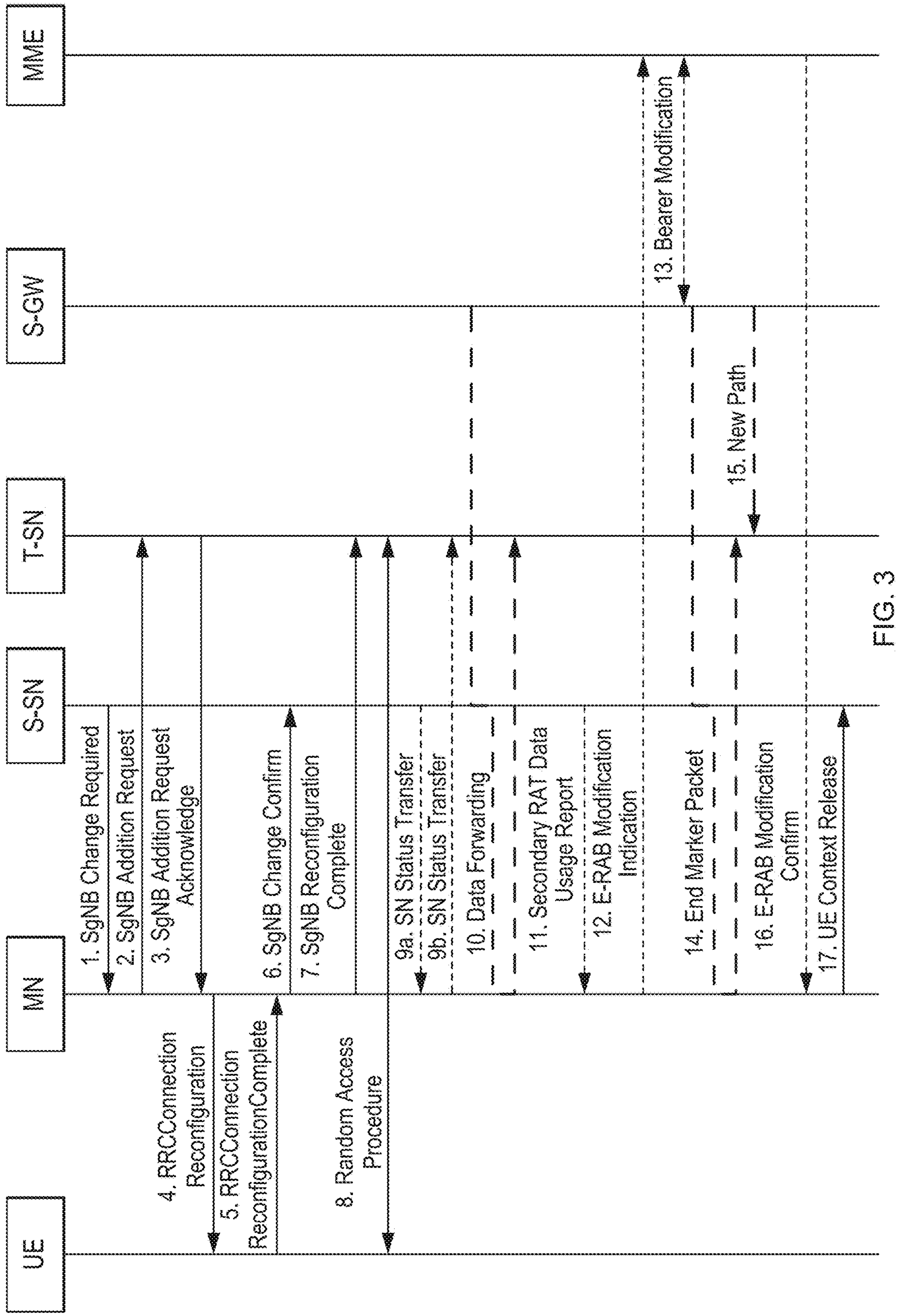
Figure 4:
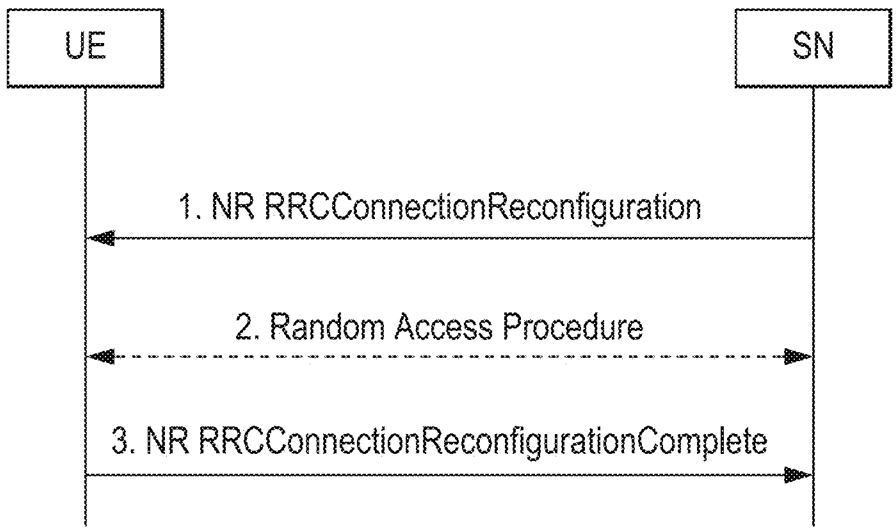
Figure 5:
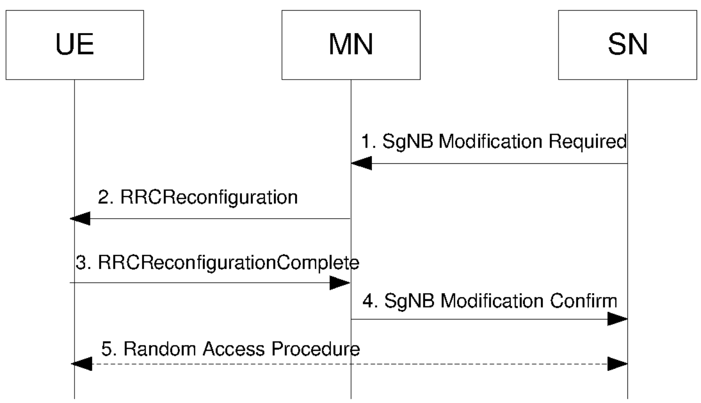

The disclosure describes the cancellation of one or multiple candidate cells (sometimes called target candidate cells) belonging to (or associated with) a target candidate SN (T-SN), after a successful SN Addition preparation The disclosure refers to a UE operating in Multi-Radio Dual Connectivity (MR-DC) according to the NR specifications e.g., TS 37.340, TS 38.331, etc. The disclosure refers to a first network node (NN) operating as a Master Node (MN), e.g., having a Master Cell Group (MCG) configured to the UE and/or an MN-terminated bearer; that MN can be a gNodeB, or a Central Unit gNodeB (CU-gNB) or an eNodeB, or a Central Unit eNodeB (CU-gNB), or any network node. The disclosure also refers to a second network node operating as a Secondary Node (SN), or Source Secondary Node (S-SN) e.g. having a Secondary Cell Group (SCG) configured to the UE and/or an SN-terminated bearer; that SN can be a gNodeB, or a Central Unit gNodeB (CU-gNB) or an eNodeB, or a Central Unit eNodeB (CU-gNB), or any network node. Notice that MN, S-SN and T-SN may be from the same or different Radio Access Technologies (and possibly be associated to different Core Network nodes).

The disclosure refers to a target candidate SN, or target SN (T-SN) candidate, as the network node (e.g. gNodeB) that is prepared during the CPC procedure and that creates an RRC Reconfiguration message with an SCG configuration to be provided to the UE and stored, with an execution condition, wherein the UE only applies the message upon the fulfilment of the execution condition. That target candidate SN is associated to one or multiple target candidate cell(s) that the UE can be configured with. The UE then can execute the condition and accesses one of these target candidate cells, associated with a target candidate SN that becomes the T-SN after execution (i.e. upon fulfilment of the execution condition).

The disclosure refers to a Conditional PSCell Change (CPC) and/or Conditional PSCell Addition (CPA) and/or Conditional PSCell Change/Addition (CPAC) configuration and procedures (like CPAC execution). Other terms may be considered as synonyms such as conditional reconfiguration, or Conditional Configuration (since the message that is stored and applied upon fulfilment of a condition is an RRCReconfiguration or RRCConnectionReconfiguration). Terminology wise, one could also interpret conditional handover (CHO) in a broader sense, also covering CPC (Conditional PSCell Change) or CPAC (Conditional PSCell Addition/Change) procedures.

The configuration of CPC can be done using the same IEs as conditional handover, which may be called at some point conditional configuration or conditional reconfiguration. The principle for the configuration is the same with configuring triggering/execution conditions and a reconfiguration message to be applied when the triggering conditions are fulfilled. The configuration IEs from TS 38.331 are shown and described below:

The ConditionalReconfiguration IE, shown in table below, is used to add, modify and release the configuration of conditional configuration.

```
ConditionalReconfiguration-r16 ::=        SEQUENCE {
attemptCcondReconfig-r16              ENUMERATED { true }           OPTIONAL,
-- Need N
condConfigToRemoveList-r16        CondConfigToRemoveList-r16    OPTIONAL,  --
Need N
condConfigToAddModList-r16         CondConfigToAddModList-r16     OPTIONAL,  -
- Need N
...
}
CondConfigToRemoveList-r16 ::=        SEQUENCE (SIZE (1.. maxNrofCondCells))
OF CondConfigId-r16
```

ConditionalReconfiguration field descriptions:
condConfigToAddModList: List of the configuration of candidate SpCells to be added or modified for CHO or CPC.
condConfigToRemoveList: List of the configuration of candidate SpCells to be removed. When the network removes the stored conditional configuration for a candidate cell, the network releases the measIDs associated to the condExecutionCond if it is not used by the condExecutionCond of other candidate cells.

The CondConfigId IE, which is shown in the table below, is used to identify a CHO or CPC configuration.

```
CondConfigId-r16 ::=  INTEGER (1.. maxNrofCond-Cells)
```

The CondConfigToAddModList IE, which is shown in the table below, concerns a list of conditional configurations to add or modify, with for each entry the cho-ConfigId and the associated condExecutionCond and condRRCReconfig.

```
CondConfigToAddModList-r16 ::=                        SEQUENCE (SIZE (1..
maxNrofCondCells)) OF CondConfigToAddMod-r16
CondConfigToAddMod-r16 ::=                      SEQUENCE {
condConfigId-r16                            CondConfigId-r16,
condExecutionCond-r16                                SEQUENCE (SIZE (1..2)) OF MeasId
OPTIONAL,    -- Need S
condRRCReconfig-r16                                  OCTET STRING (CONTAINING
RRCReconfiguration) OPTIONAL,          -- Need S
...
}
```

-continued

FIELD DESCRIPTIONS:
condExecutionCond: The execution condition that needs to be fulfilled in order to trigger the execution of a conditional configuration. The field is mandatory present when a condConfigId is being added. Otherwise, when the condRRCReconfig associated to a condConfigId is being modified it is optionally present and the UE uses the stored value if the field is absent.
condRRCReconfig: The RRCReconfiguration message to be applied when the condition(s) are fulfilled. The field is mandatory present when a condConfigId is being added. Otherwise, when the condExecutionCond associated to a condConfigId is being modified it is optionally present and the UE uses the stored value if the field is absent.

Solutions for CPC configuration (SN-generated CPC and MN-generated CPC)

The current disclosure concerns S-SN-initiated CPC cancelling. However, it is assumed that there may be different ways to realize the CPC configuration between MN, S-SN and a target candidate (which is to be cancelled).

SN-Initiated CPC

Figure 6:
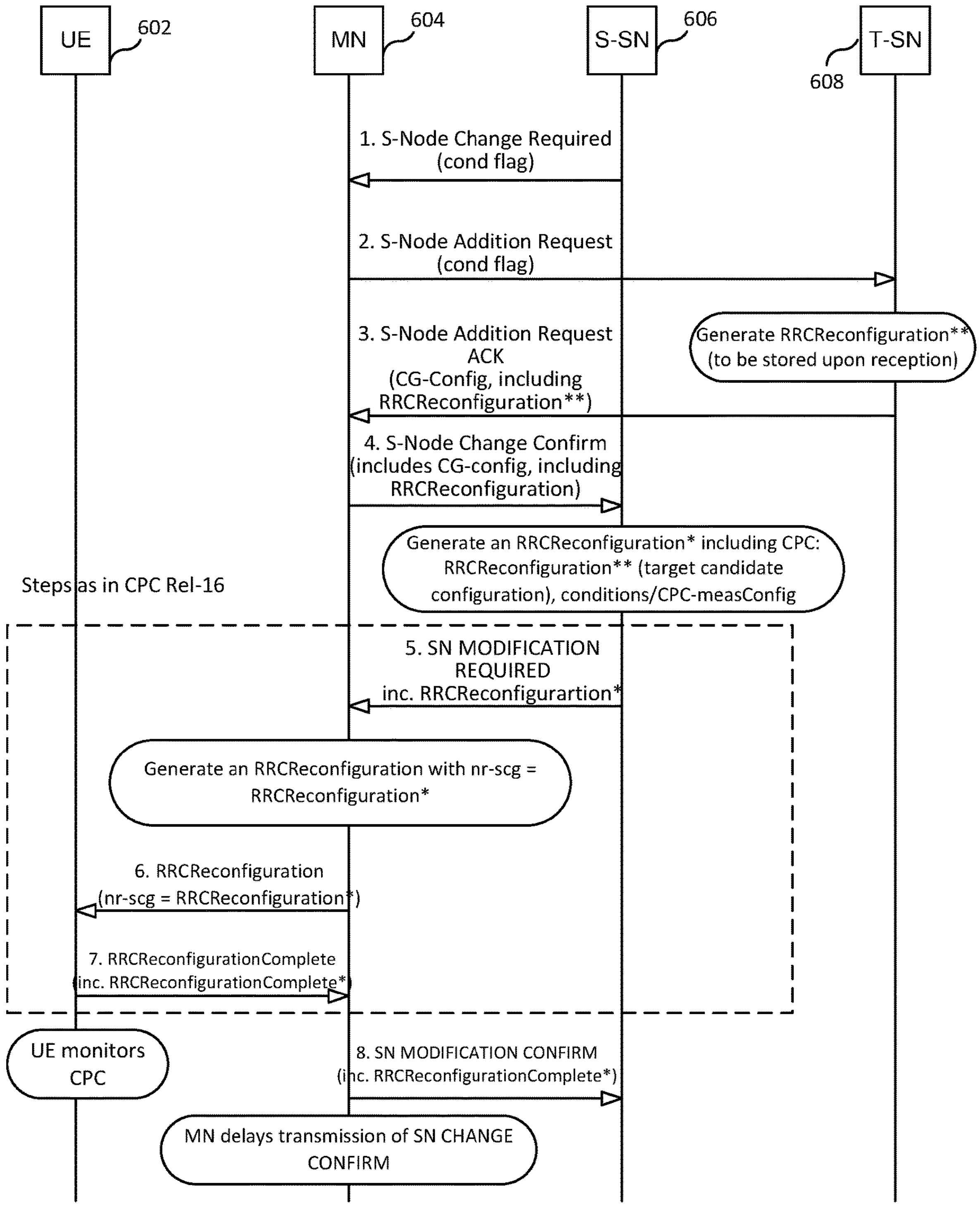
FIG. 6 is a message flow diagram illustrating an embodiment.

In one embodiment, illustrated in FIG. 6, a source SN (S-SN) 606 determines to configure CPC and transmits to a MN 604 an SN Change Required message including an indication that this is for a conditional procedure, e.g., CPC. Upon reception, the MN triggers an SN addition procedure with a target SN (T-SN) 608 indicated by the S-SN. That T-SN, upon accepting the CPC request, generates an SCG RRC Reconfiguration to be applied upon execution (RRCReconfiguration), and to be stored by the UE 602 upon reception. The T-SN transmits an SN Addition Request Ack message to the MN including the RRC SCG configuration in RRCReconfiguration in a container. In this first solution it is the SN that generates the CPC configuration, i.e., the RRCReconfiguration that contains the IE ConditionalReconfiguration. Hence, the MN needs to provide to the S-SN the RRCReconfiguration** from the T-SN (per target PSCell candidate), e.g., in an SN Change Confirm message. Upon that, the S-SN triggers an SN modification procedure to configure the UE with CPC, similar to the steps as in legacy Rel-16 CPC form this point onwards. The CPC configuration is then provided as an SCG RRC Reconfiguration (RRCReconfiguration*) to be applied by the UE upon reception. The MN then creates another RRCReconfiguration that includes the RRCReconfiguration* as an NR SCG configuration (e.g., in the field nr-scg as defined in TS 38.331). In this solution the message applied upon CPC execution by the UE is an SN-generated message, namely the RRCReconfiguration**.

Figure 7:
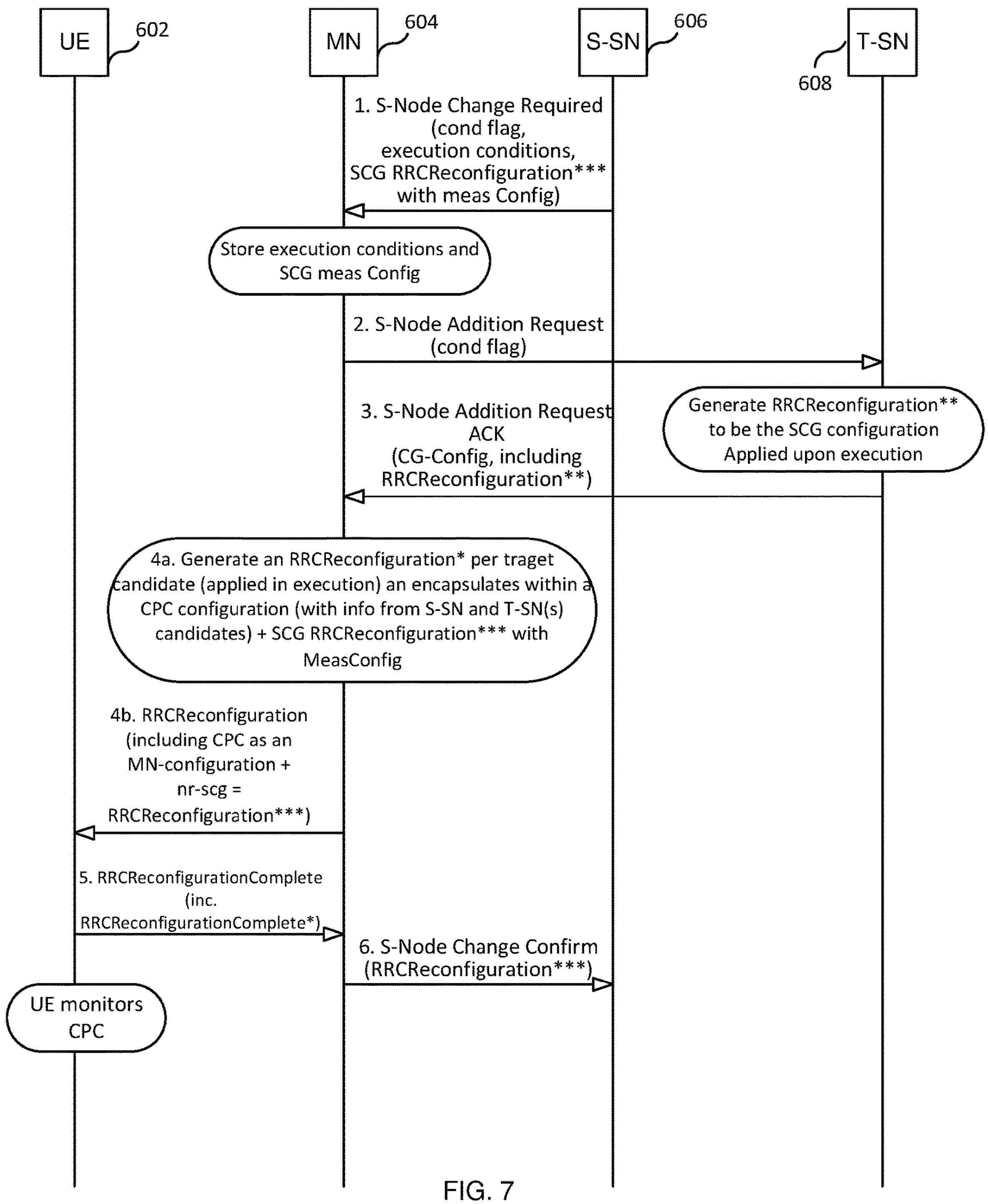
FIG. 7 is a message flow diagram illustrating an embodiment

In another embodiment, illustrated in FIG. 7, S-SN 606 determines to configure CPC and transmits to the MN 604 an SN Change Required message including an indication that this is for a conditional procedure, e.g., CPC. In addition, to enable the MN to generate the final message to be applied upon execution by the UE and to generate the CPC configuration, the S-SN also includes in the SN Change Required message the execution conditions per target candidate, and the CPC related measurement configuration (possibly in an RRCReconfiguration* message to be applied upon reception by the UE. The MN then triggers steps 2 and 3 as in the first embodiment received from the T-SN the RRCReconfiguration per target candidate from the T-SN. Then, the MN generates CPC configuration (as an MN configuration) and may generated an MN message (possibly including MN configuration) to be applied upon CPC execution by the UE, shown in step 4a of FIG. 7.

MN-Initiated CPC

In MN-initiated CPC, the difference is that the first step is initiated by the MN. However, an SN Addition procedure is anyways required between the MN and a target candidate T-SN. Even if this is an MN-initiated CPC, in principle the CPC configuration can be created by the SN or by the MN. For a solution where the SN generates the CPC configuration, the MN needs to request the SN to generate the configuration, as in the embodiment for SN-initiated (see FIG. 6).

Figure 8:
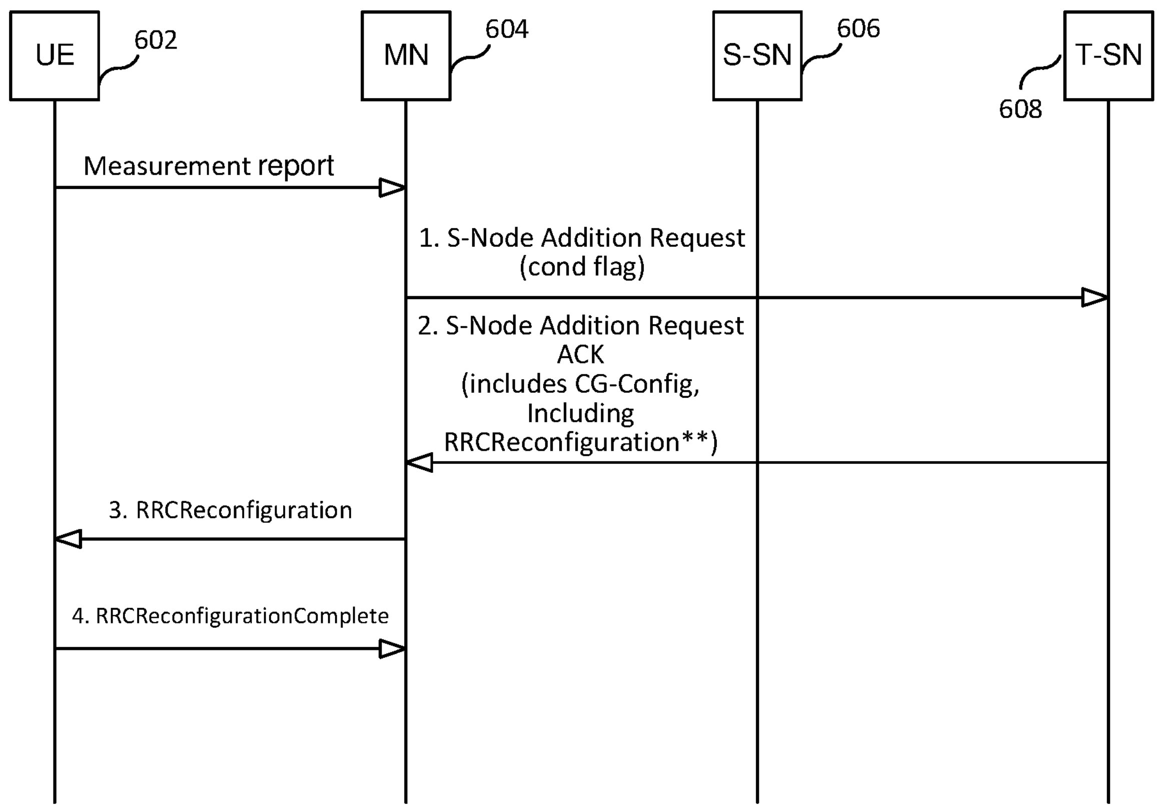
FIG. 8 is a message flow diagram illustrating an embodiment

For a solution where the MN generates CPC configuration, the MN does not need to request the SN to generate the configuration as in the embodiment for SN-initiated as shown in FIG. 7. This is illustrated in FIG. 8.

In the different embodiment presented above for CPC configuration, regardless if SN-initiated or MN-initiated CPC, an aspect related to the disclosure is that the S-SN determines to cancel CPC. Then, the S-SN sends an indication of CPC cancelling to the MN. Upon reception the MN sends an indication of CPC cancelling to a target candidate SN configured with CPC.

The method comprises different embodiments for S-SN initiated cancel of conditional PSCell Change (CPC), in terms of inter-node signaling and inter-node procedures, for the cases inter-SN MN-initiated conditional PSCell Change and inter-SN SN-initiated conditional PSCell Change.

In one set of embodiments, a network node operating as Source Secondary Node (S-SN), decides to cancel the configuration of CPC for at least a given UE operating in MR-DC. The configuration of Conditional PSCell Change (CPC) for a UE operating in MR-DC has previously been initiated by a network node operating as Master Node (MN) and the MN has built the message towards the UE containing the CPC configuration. The determination to cancel CPC may be based on measurements reports received from the UE. Upon determining to cancel CPC, the MN may initiate a procedure according to the following.

Option A: The S-SN Cancels MN-Initiated CPC

In this option, the MN initiates the configuration of conditional PSCell Change (CPC). The final message to the UE containing the conditional reconfiguration may either be generated in the MN or in the S-SN.

If the message including CPC configuration is generated in the MN (CPC not provided as an SCG configuration to the UE) the message to be applied upon execution (i.e., when the conditions are fulfilled) contains an SCG configuration that is sent from the T-SN to the MN, so the MN adds the conditions and sends the message to the UE. This option is shown in FIG. 9.

If the message including CPC configuration is generated in the S-SN (CPC provided as an SCG configuration to the UE), the MN forwards the SCG configuration (to be applied upon execution by the UE) from the T-SN to the S-SN which adds the conditions and replies back to the MN with the message including the CPC configuration to the UE. The MN then generates an RRC Reconfiguration message including an SCG Reconfiguration (e.g. nr-scg field) wherein that SCG Reconfiguration includes the conditional reconfiguration (IE ConditionalReconfiguration).

Figure 9:
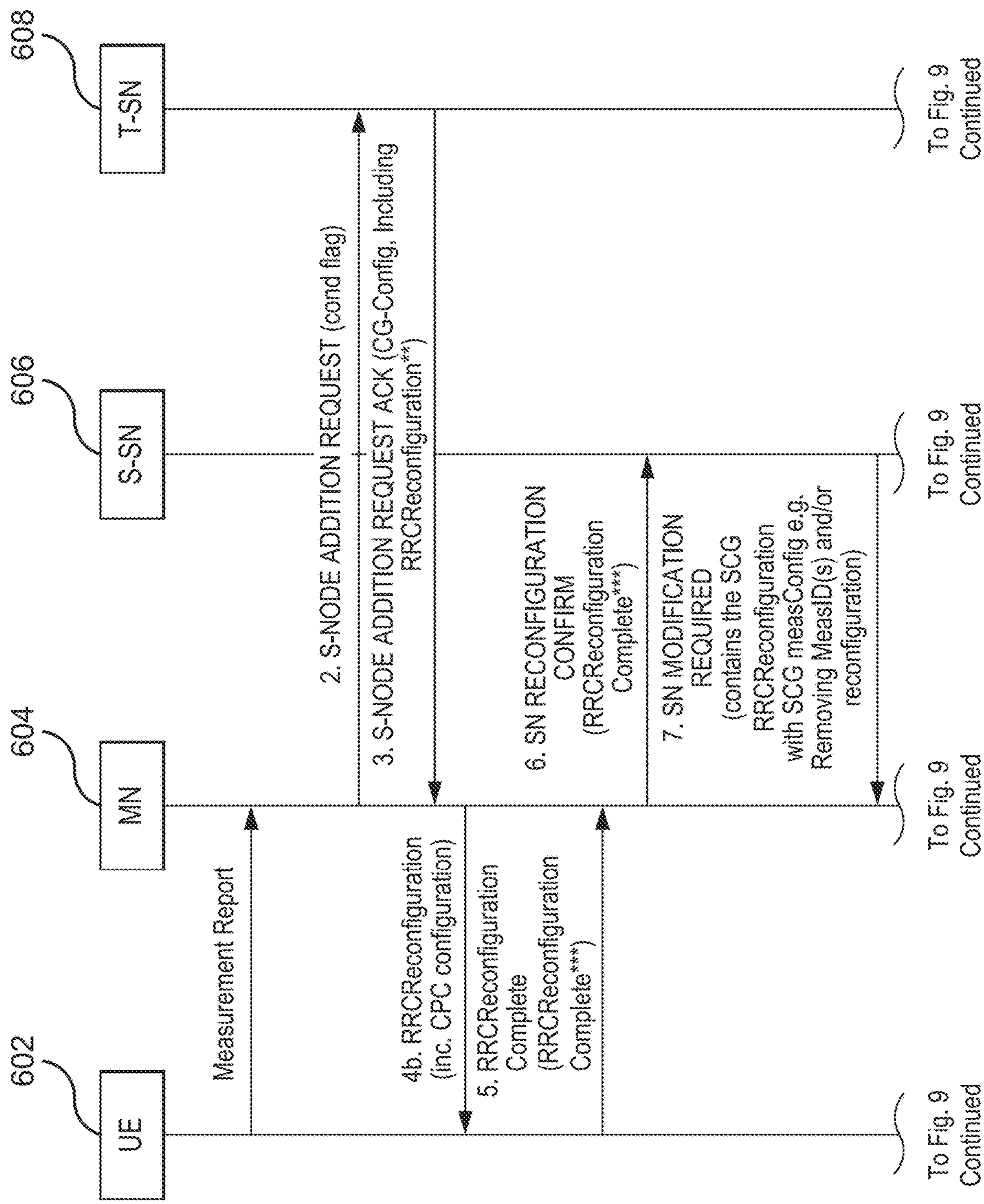
FIG. 9 is a message flow diagram illustrating an embodiment
Figure 9:
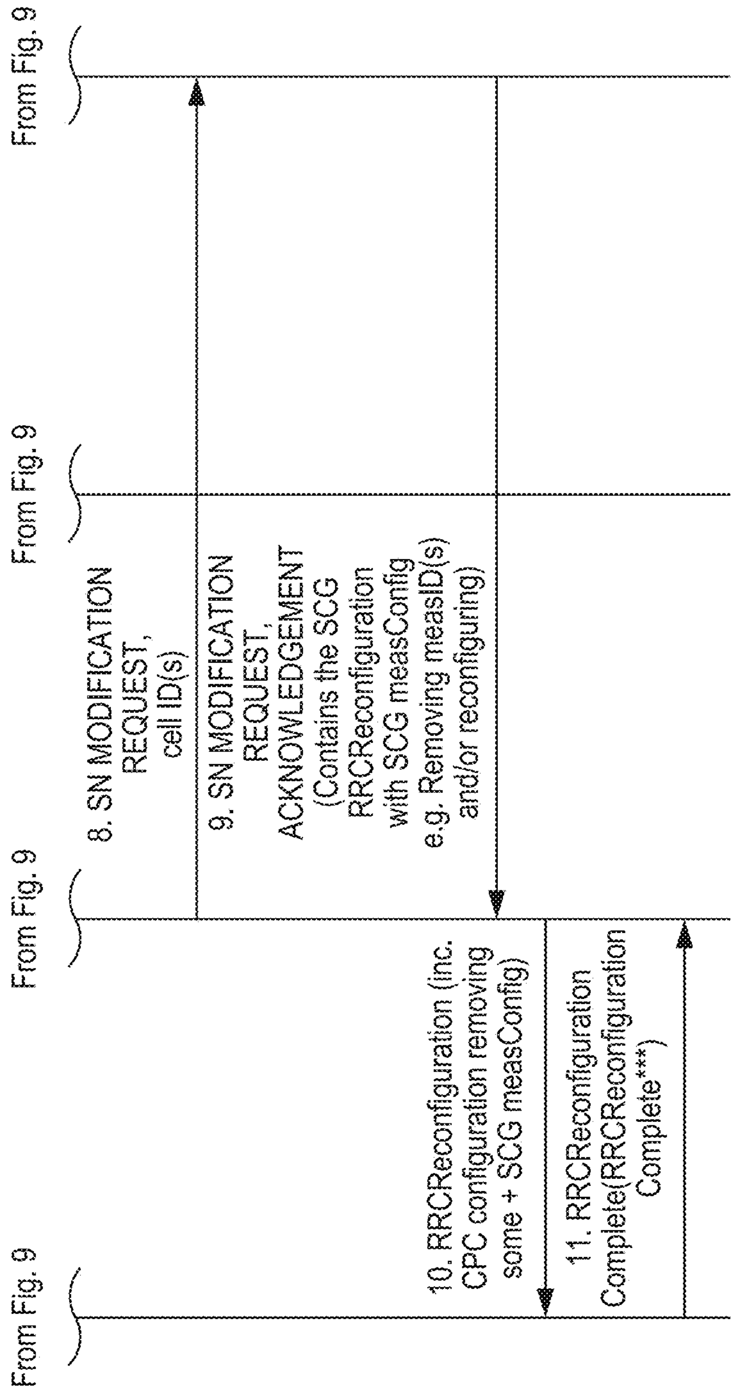

The steps shown in FIG. 9 are described below.

(Step 1-6) contains the configuration of CPC with the MN generating the reconfiguration message towards the UE where CPC is configured. The configuration may be done in a different way using different messages and/or different signalling flow, but it does not make any difference for this invention.

(Step 7) The node operating as Secondary Node (SN) sends an indication to the MN that CPC is to be cancelled (e.g. for at least a target candidate cell and/or node). The indication can contain a reconfiguration to the UE (e.g. transmitted in an RRC container), so that CPC target candidate(s) are removed and, a list of candidate cell(s) to be cancelled for CPC, indicated as part of the inter-node message (e.g. XnAP message).

In one option, the S-SN indicates the reason for cancelling the conditional PSCell change by means of an appropriate cause value. There may be different options on how that indication can be transmitted and actions associated to it. In a first option that indication can be an S-NODE MODIFICATION REQUIRED message including indication of cancellation of target candidate cells to the MN. The advantage is that the S-SN is indeed indicating to the MN that the UE's configuration is to be modified (as CPC configuration for at least one target candidate is to be removed). That option especially makes sense in the case CPC is an SCG configuration e.g. if the SN is the one generating the CPC configuration that is now being modified (i.e. at least one target candidate is being removed). The message to the MN contains an SCG RRCReconfiguration* message, releasing the CPC candidates. The MN uses the RRCReconfiguration* message and may add more MN related information when building the final message sent to the UE e.g. reconfiguring measurements, bearers, etc., especially if all candidates are being removed. The message to the MN also includes information of which target candidate cells and/or target candidate SNs are to be cancelled, so that the MN can indicate the cancelling to the correct target candidate SN and/or for the correct target candidate cell(s). The information may, e.g., be a list of cells or the identifiers (ID)s of the conditional reconfiguration for CPC. In the case of a cell list an addition issue may exists e.g. in case the UE is configured with CPC to the same cell as it is configured with CHO. Then the UE cannot know if it is the CHO or the CPC configuration that is to be cancelled. In that case the cell ID may be sent together with additional information, e.g. a CPC indication, a CHO indication, the measID for the conditional reconfiguration or some other indication.

Alternatively, that indication is an S-NODE RELEASE REQUIRED message including indication of cancellation of target candidate cells to the MN. The S-SN may send an S-NODE RELEASE REQUIRED message instead, containing similar information as in S-NODE MODIFICATION REQUIRED. In one sub-alternative, the S-NODE RELEASE REQUIRED message is used to release all CPC configurations, i.e., not a subset of the configured target candidate cells associated to that target candidate SN. The content of the messages and the actions between the network nodes described in the first option can also be included in this option. Alternatively, the SN may send a new message instead, e.g., a CPC CANCEL message, including indication of cancellation of target candidate cells to the MN. In one sub-option, if all target candidate cells associated to the target candidate SN receiving the message, the empty message (i.e. without a cell list) can indicate that. The content of the messages and the actions between the network nodes described in the first option can also be included in this option. Alternatively, the SN may send a CHO CANCEL message, including indication of cancellation of target candidate cells to the MN for CPC. The content of the messages and the actions between the network nodes described in the first option can also be included in this option. In yet another alternative, the request does NOT contain an SCG RRC Reconfiguration including the cells to be removed. Instead, this message in step 7 contains just the indication to the MN so the MN can cancel CPC with the target candidate SNs. Once that step is performed by the MN, and the MN possibly receives a confirmation from the target candidate SN, the MN indicates that to the S-SN, so that the S-SN can generate the CPC configuration (i.e., the SCG RRC Reconfiguration with CPC) including the CPC target candidate cells to be removed.

(Step 8) Upon reception of the indication from the S-SN to cancel CPC (towards a target candidate SN), the MN determines which target candidate SN(s) are to be CPC cancelled. Upon that determination, the node operating as Master Node (MN) sends an indication to the determined target candidate SN that CPC is to be cancelled (for at least one of its target candidate cells). There may be different options on how the MN can indicate CPC cancel to a target candidate SN.

In one option, the MN sends an S-NODE MODIFICATION REQUEST message including indication of cancellation of cells to the T-SN (e.g. a list of cells, a list of cell identifiers, a list of other type of identifiers, etc.). Alternatively, the MN may send an S-NODE RELEASE REQUEST message instead, containing similar information as in S-NODE MODIFICATION REQUEST. Notice that the legacy S-NODE RELEASE REQUEST indicates the complete release of configurations while according to this option, the message may contain an indication indicating that this is for releasing CPC for at least one target candidate cell. In case the MN determines to release all target candidate cells for a given target candidate SN, the message can be transmitted without any additional indication so that upon reception the target candidate SN releases all CPC configurations, stored context for that UE, release resources, etc.

Alternatively, the MN may send a new message instead, e.g. a CPC CANCEL message, including indication of cancellation of target candidate cells to the target candidate SN. In one sub-option, if all target candidate cells associated to the target candidate SN receiving the message, the empty message (i.e. without a cell list) can indicate that. The content of the messages and the actions between the network nodes described in the first option can also be included in this option. Alternatively, the MN may send a new message instead, e.g. a SN ADDITION CANCEL message, including indication of cancellation of target candidate cells to the target candidate SN. In one sub-option, if all target candidate cells associated to the target candidate SN receiving the message, the empty message (i.e. without a cell list) can indicate that. The content of the messages and the actions between the network nodes described in the first option can also be included in this option.

(Step 9) The node operating as target candidate SN (optionally) acknowledges the cancellation of CPC cells in the T-SN by transmitting to the MN an S-NODE MODIFICATION REQUEST ACKNOWLEDGE or alternatively by transmitting to the MN an S-NODE RELEASE REQUEST ACKNOWLEDGE message (or any other response message, transmitted by the T-SN in response to a request or indication to cancel CPC). That may be useful in case the target candidate SN determines to cancel more cells that the ones requested by the MN, to that response message may indicate which target candidate cells have been effectively cancelled at the target candidate SN. There is also an option that the target candidate SN does not acknowledge the cancellation of CPC (a Class 2 procedure), it is taken for granted that the cancellation is successful in the target candidate SN.

In yet another alternative, in case the request from the S-SN to the MN to cancel CPC did NOT contain an SCG RRC Reconfiguration including the cells to be removed, upon acknowledging that CPC has been cancelled towards a target candidate SN (e.g., by reception of a message from the T-SN), the MN indicates that to the S-SN, so that the S-SN can generate the CPC configuration (i.e., the SCG RRC Reconfiguration with CPC) including the CPC target candidate cells to be removed. At this point the MN has a CPC configuration from the S-SN for removing CPC in the UE with an RRC Reconfiguration.

In the previous steps, it has been assumed that the SN generates the CPC configuration as an SCG configuration, even if this is an MN-initiated CPC. However, in another alternative, it is the MN that generates the CPC configuration. The difference if it is the MN generating CPC is that the configuration towards the UE to remove the CPC target candidates is also generated by the MN. Hence, all previous steps remain the same, except the inclusion of SCG reconfiguration from the SN to the MN and/or requests/indications from the MN to the SN for the SN to generate an SCG RRC Reconfiguration to remove CPC candidates in the UE. At the reception of the acknowledge message, the MN considers that the target candidate SN is about to remove any reference to, and release any resources previously reserved for candidate cells associated to the UE-associated signalling identified by the MN node UE XnAP ID IE and the target candidate SN NG-RAN node UE XnAP ID IE.

(Step 10) The node operating as Master Node (MN) sends an RRCReconfiguration message to the UE, containing the new UE configuration where the previously configured CPC cells have been removed from the configuration. Step 10 and 11 may also be done before step 8 and 9 or in parallel with step 8 and 9.

(Step 11) The UE completes the reconfiguration (i.e. remove the indicated CPC candidates) and informs the MN in an RRCReconfigurationComplete message.

An example in RRC 38.331 is shown below with the overall procedure, for the case CPC is an MN-generated configuration (i.e. the IE ConditionalReconfiguration is provided to the UE in an RRCReconfiguration message including the condReconfigToRemoveList).

```
RRCReconfiguration-v1610-IEs ::=        SEQUENCE {
...
conditionalReconfiguration-r16          ConditionalReconfiguration-r16
OPTIONAL, -- Need M
...
}
```

The ConditionalReconfiguration IE is used to add, modify and release the configuration of conditional reconfiguration.

```
ConditionalReconfiguration information element
ConditionalReconfiguration-r16 ::=     SEQUENCE {
...
condReconfigToRemoveList-r16           CondReconfigToRemoveList-r16    OPTIONAL,   --
Need N
...
}
CondReconfigToRemoveList-r16 ::=       SEQUENCE (SIZE (1.. maxNrofCondCells-r16))
OF CondReconfigId-r16
```

The UE actions are defined as follows. The UE shall: for each condReconfigId value included in the condReconfigToRemoveList that is part of the current UE conditional reconfiguration in VarConditionalReconfig: remove the entry with the matching condReconfigd from the VarConditionadReconfig.

Below is an example implementation of updated S-NODE RELEASE REQUIRED and sending of conditional reconfiguration ID. This message is sent by the S-NG-RAN node to request the release of ~~all~~ resources for a specific UE at the S-NG-RAN node.

Direction: S-NG-RAN node→M-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| S-NG-RAN node UE XnAP ID | M | | NG-RAN node UE XnAP ID 9.2.3.16 | Allocated at the S-NG-RAN node |
| PDU sessions To Be Released | | 0 . . . 1 | | |
| >PDU Session Resources to be released List - SN terminated | O | | PDU session List with data forwarding request info 9.2.1.24 | |
| Cause | M | | 9.2.3.2 | |
| S-NG-RAN node to M-NG-RAN node | O | | OCTET STRING | Includes the CG-Config |

-continued

| IE/Group Name | Presence | Range | IE type and reference | Semantics description |
|---|---|---|---|---|
| Container | | | | message as defined in TS 38.331 [10]. |
| Candidate Cells To Be Cancelled List | | 0 . . . <maxNrofCondCells> | | |
| >Conditional reconfiguration ID | M | | Conditional reconfiguration ID 9.2.3.x | |

| Range bound | Explanation |
|---|---|
| maxNrofCondCells | Maximum number of conditional reconfigurations. Value is 8. |

9.2.3.x Conditional Reconfiguration ID

This IE is defined in TS 38.331 [10] in CondReconfigID and is used to uniquely identify a CHO, CPC or CPA configuration.

| IE/Group Name | Presence | Range | IE type and reference |
|---|---|---|---|
| CONDRECONFIGID | M | | INTEGER (0 . . . maxNrofCondCells) |

S-NG-RAN Node Initiated S-NG-RAN Node Release

Figure 10:
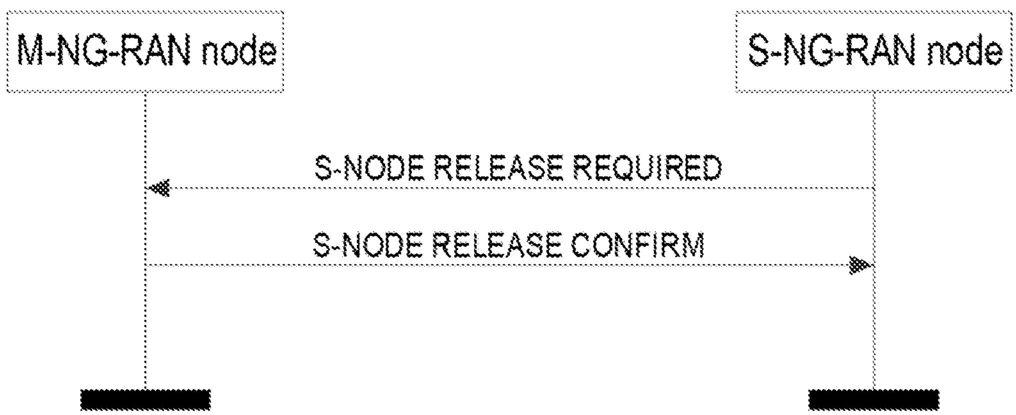
FIG. 10 is a message flow diagram illustrating an embodiment

This procedure, illustrated in FIG. 10, is triggered by the S-NG-RAN node to initiate the release of the resources for a specific UE and/or to indicate CPC cancelation initiated by the S-NG-RAN node. The procedure uses UE-associated signalling. The S-NG-RAN node initiates the procedure by sending the S-NODE RELEASE REQUIRED message to the M-NG-RAN node. Upon reception of the S-NODE RELEASE REQUIRED message, the M-NG-RAN node replies with the S-NODE RELEASE CONFIRM message.

The S-NG-RAN node may start data forwarding and stop providing user data to the UE upon reception of the S-NODE RELEASE CONFIRM message, except if the S-NODE RELEASE REQUIRED was sent for a CPC cancelling.

If the S-NG-RAN node to M-NG-RAN node Container IE is included in the S-NODE RELEASE REQUIRED message, the M-NG-RAN node may use the contained information to apply delta configuration. In the case of CPC cancellation, it may contain the configuration to remove CPC target cell candidates.

Option B1:

In this option, the S-SN cancels SN-initiated CPC. Also in this option, illustrated in FIG. 11, the S-SN initiates the configuration of conditional PSCell Change (CPC) and the final message sent to the UE with the conditional reconfiguration is built/generated in S-SN.

Figure 11:
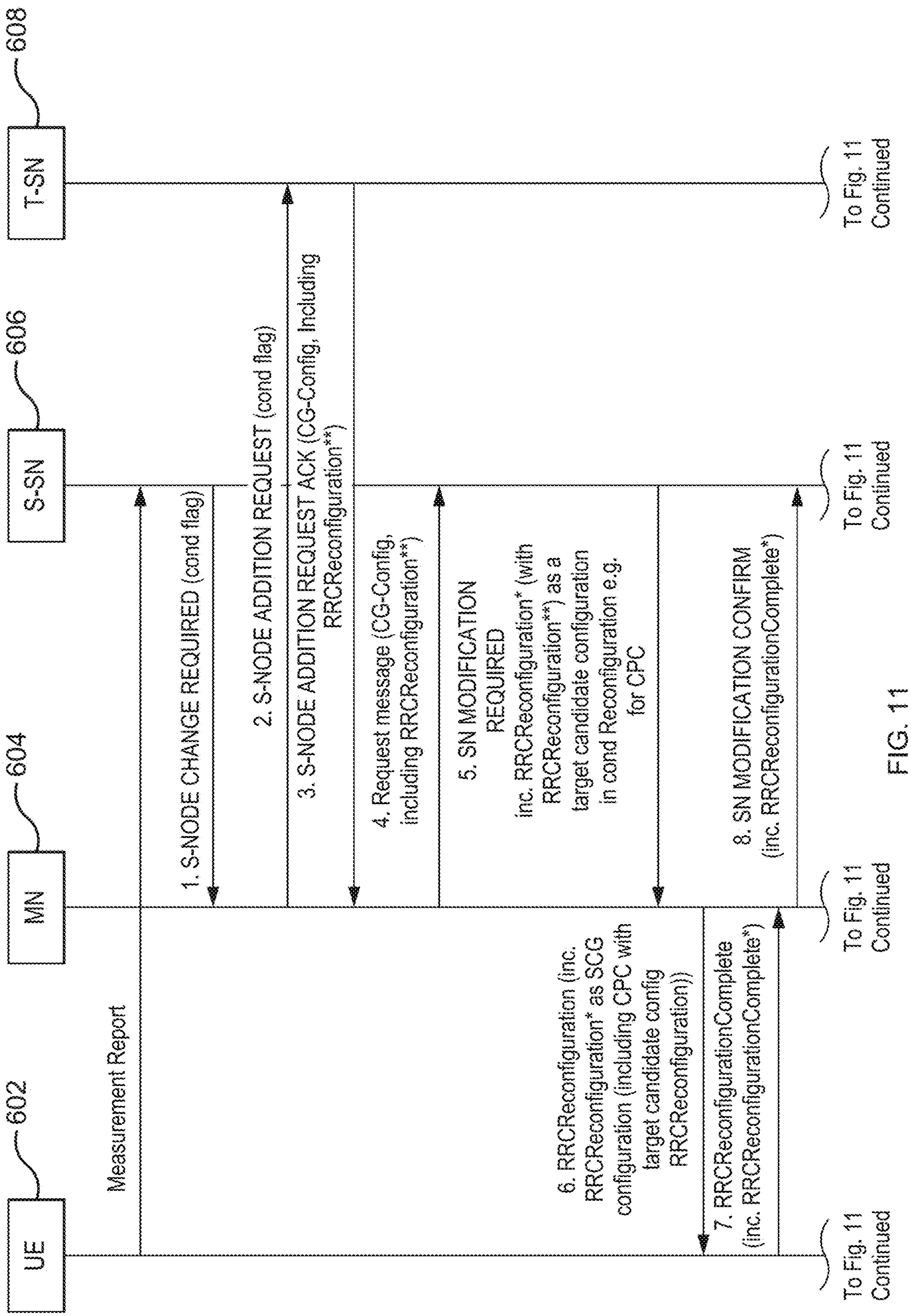
FIG. 11 is a message flow diagram illustrating an embodiment
Figure 11:
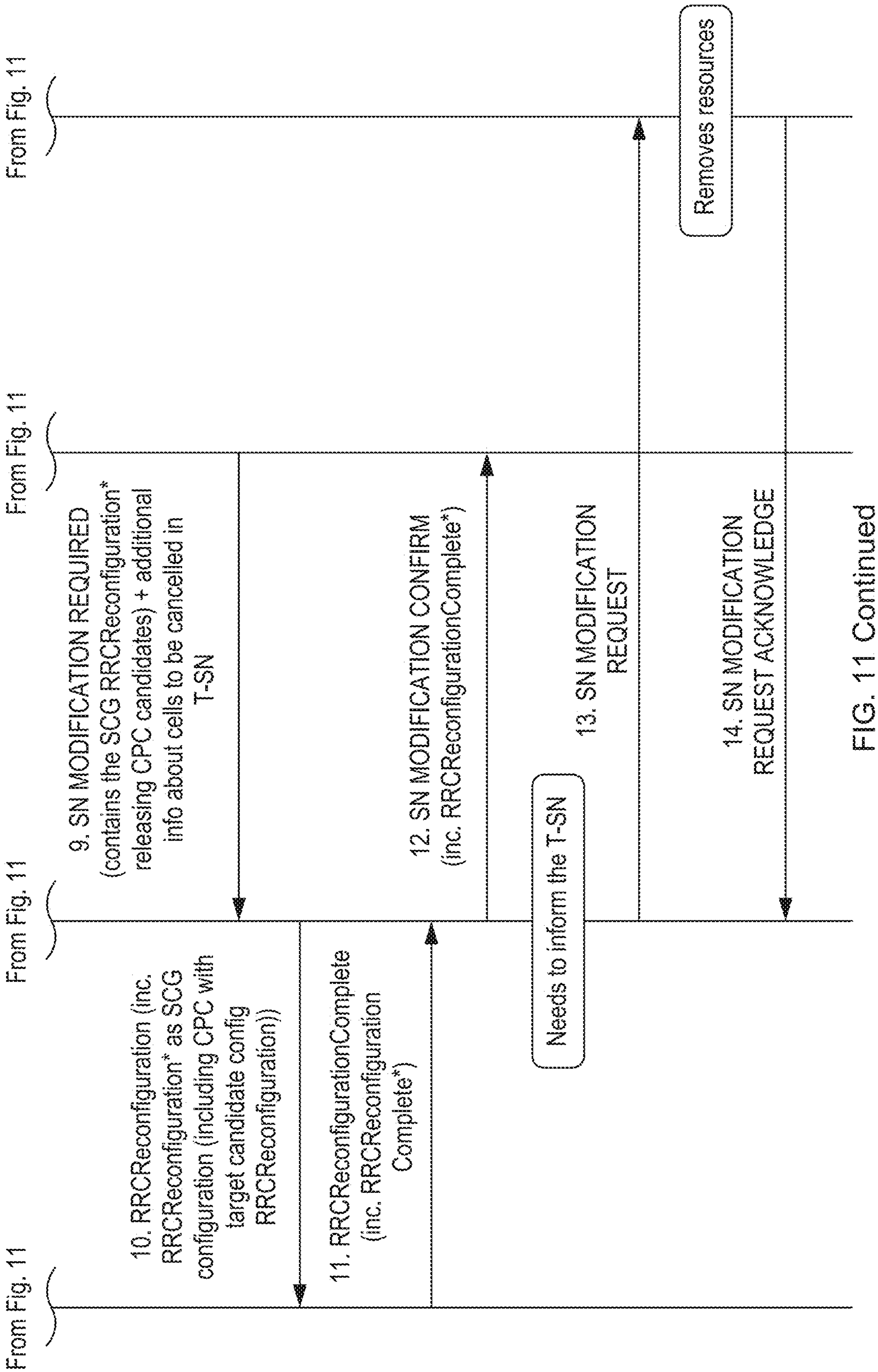

The message can be sent directly to the UE in case SRB3 is configured, otherwise the message is transferred to the MN, which provided the message to the UE (in an SCG RRC container). For option B some different variants of when the UE reconfiguration is done is shown. These different variants exist also for option A, i.e., the UE reconfiguration may take place before or after informing T-SN about the cancellation also in option A. The new Information message in step 15 in option B2 and the new Error message in step 15 in option B3 may be sent in option A also. The reconfiguration towards the UE is in this option B1 done first, before informing T-SN about the cancellation. The steps shown in FIG. 11 are described below.

(Step 1-8) contains the configuration of CPC with the S-SN building the reconfiguration message towards the UE where CPC is configured (RRCReconfiguration* as shown in the figure, in step 5, to be provided to the UE within an nr-scg field as a container within another RRCReconfiguration from the MN, as in step 6). The configuration may be done in a different way using different messages and/or different signalling flow, but it does not make any difference for this invention.

(Step 9) The node operating as Secondary Node (SN) sends a message including an indication of cancellation of target candidate cells (e.g. target candidate PSCells) to the MN.

The message to the MN contains an SCG RRCReconfiguration* message to be sent to the UE, releasing the CPC candidates. The message to the MN also includes information of which cells where CPC is cancelled, so that the MN can forward the release request to the correct target candidate SN. The information may e.g. be a list of cells or the ID of the conditional reconfiguration. In one option the message is an S-NODE MODIFICATION REQUIRED message including indication of cancellation of target candidate cells (e.g. target candidate PSCells) to the MN. In another option, an S-NODE RELEASE REQUIRED with a list of target candidate cells to be cancelled, or conditional reconfiguration IDs are sent from the S-SN.

(Step 10) The node operating as Master Node (MN) sends an RRCReconfiguration message to the UE (including the RRCReconfiguration* as the SCG RRC container), containing the new UE configuration where the previously configured CPC cells have been removed from the configuration within the RRCReconfiguration* in the SCG RRC container (in the case we assume that CPC is generated at the SN, as in Rel-16 CPC intra-node solution).

(Step 11) The UE completes the reconfiguration and informs the MN in an RRCReconfigurationComplete message.

(Step 12) The node operating as Master Node (MN) sends a message, possibly including an SCG complete message to the S-SN (RRCReconfigurationComplete*), indicating that the configuration has been provided to the UE i.e. indicating that the UE has removed the CPC configurations as indicated by the S-SN in previous steps. In one option the message is an SN MODIFICATION CONFIRM (which is a response to step 9)

(Step 13) The node operating as Master Node (MN) sends a message to a target candidate SN including an indication of cancellation of target candidate cells (e.g., target candidate PSCells) to at least one target candidate SN. Upon reception the target candidate SN determines which target candidate cells are to be cancelled/removed for CPC configuration.

In one option that message is an S-NODE MODIFICATION REQUEST message including indication of cancellation of cells to the T-SN, e.g., a list of cells for which CPC configuration is to be cancelled. In one option that message is an S-NODE RELEASE REQUEST message including indication of cancellation of cells to the T-SN, e.g., a list of cells for which CPC configuration is to be cancelled. In another option, a new message, e.g., CPC CANCEL is sent to the target candidate SN. In one option, the node operating as target candidate SN sends an acknowledgement of the cancellation of CPC cells in the T-SN by responding the request to cancel with a message. In other words, in this option a class 1 procedure of an inter-node control protocol (like XnAP) would be used for the cancelling of CPC from the MN to a target candidate SN.

(Step 14) The target candidate (optionally) sends an acknowledgement that the resources have been removed (a Class 1 procedure). In case of a Class 2 procedure (another option), this step does not exist.

An example implementation in TS 38.423 is shown below.

In step 9, additional information related to what cells that are cancelled, needs to be transferred to the MN outside the SCG configuration, so that the MN knows which SN to inform about the cancellation of CPC. Below the target cell IDs are added (highlighted) in the S-NODE MODIFICATION REQUIRED message. Another alternative would be that the conditional reconfiguration IDs are transferred instead.

S-Node Modification Required

This message is sent by the S-NG-RAN node to the M-NG-RAN node to request the modification of S-NG-RAN node resources for a specific UE. Direction: S-NG-RAN node→M-NG-RAN node.

| IE/Group Name | Presence | Range | IE type and reference | Semantics description |
|---|---|---|---|---|
| Message Type | M | | 9.2.3.1 | |
| M-NG-RAN node UE XnAP ID | M | | NG-RAN node UE XnAP ID 9.2.3.16 | Allocated at the M-NG-RAN node |
| S-NG-RAN node UE XnAP ID | M | | NG-RAN node UE XnAP ID 9.2.3.16 | Allocated at the S-NG-RAN node |
| Cause | M | | 9.2.3.2 | |
| PDCP Change Indication | O | | 9.2.3.74 | |
| PDU Session Resources To Be Modified List | | 0 . . . 1 | | |
| >PDU Session Resources To Be Modified Item | | 1 . . . <maxnoofPDUSessions> | | |
| >>PDU Session ID | M | | 9.2.3.18 | |
| >>PDU Session Resource Modification Required Info - SN terminated | O | | 9.2.1.20 | |
| >>PDU Session Resource Modification Required Info - MN terminated | O | | 9.2.1.22 | |
| PDU Session Resources To Be Released List | | 0 . . . 1 | | |
| >PDU Session Resources To Be Released Item | | 1 . . . <maxnoofPDUSessions> (e.g., 256) | | |
| >PDU sessions to be released List - SN terminated | O | | PDU session List with data forwarding request info 9.2.1.24 | |
| >PDU sessions to be released List - MN terminated | O | | PDU session List with Cause 9.2.1.26 | |
| S-NG-RAN node to M-NG-RAN node Container | O | | OCTET STRING | Includes the CG-Config message as defined in subclause 11.2.2 of TS 38.331 [10]. |

-continued

| IE/Group Name | Presence | Range | IE type and reference | Semantics description |
|---|---|---|---|---|
| Spare DRB IDs | O | | DRB List 9.2.1.29 | Indicates the list of unnecessary DRB IDs that had been used by the S-NG-RAN node. |
| Required Number of DRB IDs | O | | Number of DRBs 9.2.3.78 | Indicates the number of DRB IDs that the S-NG-RAN node requests more. |
| Location Information at S-NODE | O | | Target Cell Global ID 9.2.3.25 | Contains information to support localisation of the UE |
| MR-DC Resource Coordination Information | O | | 9.2.2.33 | Information used to coordinate resource utilisation between M-NG-RAN node and S-NG-RAN node. |
| RRC Config Indication | O | | 9.2.3.72 | |
| Candidate Cells To Be Cancelled List | | 0 . . . <maxnoofCellsinCHO> | | |
| >Target Cell ID | M | | Target Cell Global ID9.2.3.25 | |

In another embodiment, the cancellation information, e.g. the list of cells to be cancelled or the conditional reconfiguration ID, is contained in S-NODE RELEASE REQUIRED instead of S-NODE MODIFICATION REQUIRED and S-NODE RELEASE REQUEST instead of S-NODE MODIFICATION REQUEST.

Option 1B2:

In this option, the S-SN cancels SN-initiated CPC, and UE reconfiguration is done after T-SN is informed.

Figure 12:
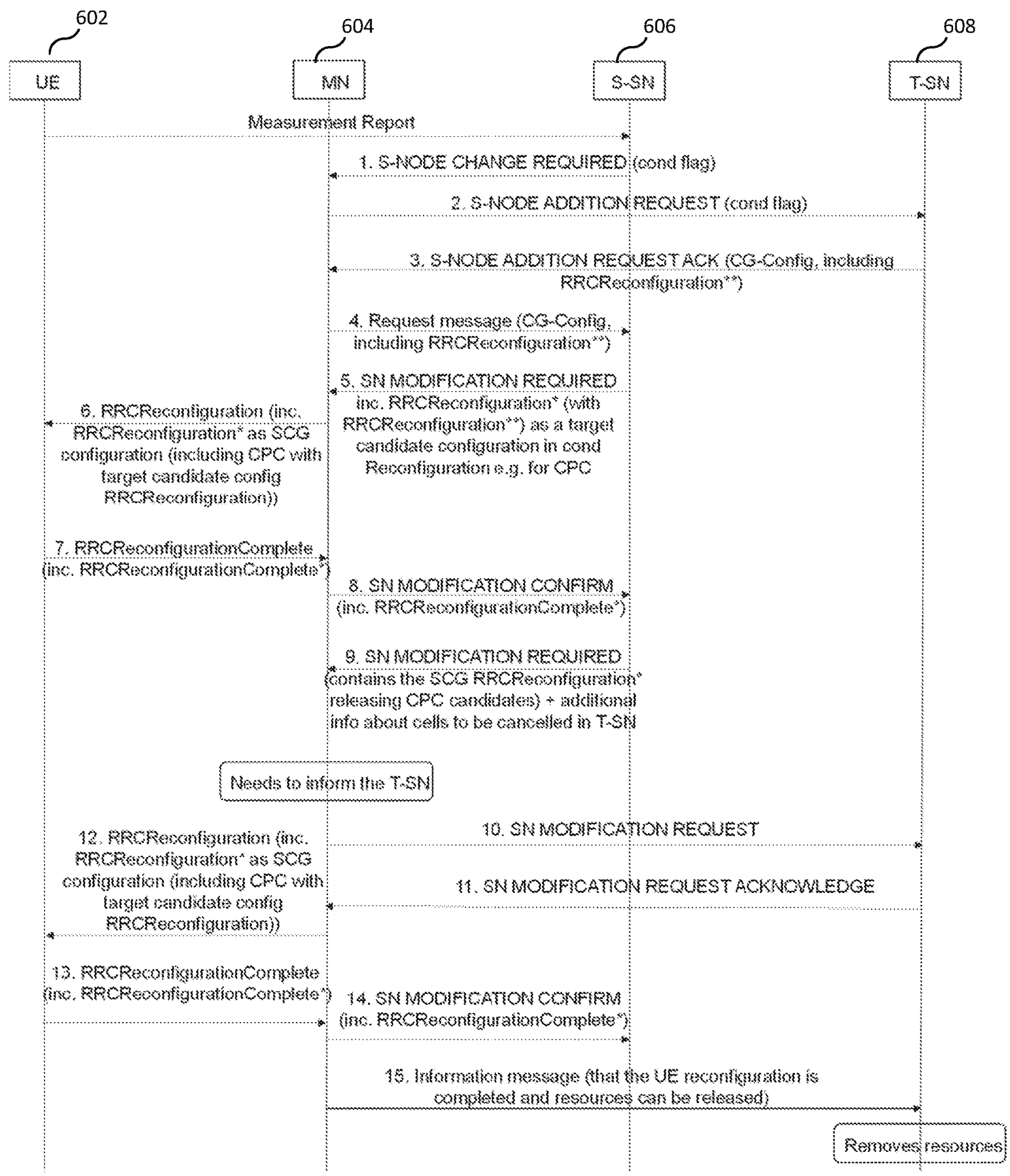
FIG. 12 is a message flow diagram illustrating an embodiment

Also, in this option the S-SN initiates the configuration of conditional PSCell Change (CPC) and the final message sent to the UE with the conditional reconfiguration (for CPC) is built in S-SN (i.e. the IE ConditionalReconfiguration is provided within an SCG RRC Reconfiguration e.g. nr-scg). The message can be sent directly to the UE in case SRB3 is configured, otherwise the message is transferred to the MN, which provides the message to the UE (in an SCG RRC Reconfiguration, like the field nr-scg within an MN built message). Later, the S-SN decides/determines to cancel the configuration of CPC (and indicates that to the MN so the MN can cancel CPC towards a target candidate SN). The reconfiguration of the UE is in this option done after informing the target candidate SN about the cancellation. FIG. 12 illustrates the procedure. The steps shown in FIG. 12 are described below.

(Step 1-8) contains the configuration of CPC with the S-SN building the reconfiguration message towards the UE where CPC is configured (RRCReconfiguration* as shown in the figure, in step 5, to be provided to the UE within an nr-scg field as a container within another RRCReconfiguration from the MN, as in step 6). The configuration may be done in a different way using different messages and/or different signalling flow, but it does not make any difference for this invention.

(Step 9) The node operating as Secondary Node (SN) sends a message including an indication of cancellation of target candidate cells (e.g. target candidate PSCells) to the MN.

The message to the MN contains an SCG RRCReconfiguration* message to be sent to the UE, releasing the CPC candidates. The message to the MN also includes information of which cells where CPC is cancelled, so that the MN can forward the release request to the correct target candidate SN. The information may e.g. be a list of cells or the ID of the conditional reconfiguration. In one option the message is an S-NODE MODIFICATION REQUIRED message including indication of cancellation of cells to the MN. In another option, an S-NODE RELEASE REQUIRED with a list of target candidate cells to be cancelled, or conditional reconfiguration IDs are sent from the S-SN.

(Step 10) The node operating as Master Node (MN) sends a message to a target candidate SN including an indication of cancellation of target candidate cells (e.g. target candidate PSCells) to at least one target candidate SN. Upon reception the target candidate SN determines which target candidate cells are to be cancelled/removed for CPC configuration.

In one option that message is an S-NODE MODIFICATION REQUEST message including indication of cancellation of cells to the T-SN e.g. a list of cells for which CPC configuration is to be cancelled. In one option that message is an S-NODE RELEASE REQUEST message including indication of cancellation of cells to the T-SN e.g. a list of cells for which CPC configuration is to be cancelled. In another option, a new message, e.g. CPC CANCEL is sent to the target candidate SN.

(Step 11) In one option, the node operating as T-SN acknowledges the cancellation of CPC cells in the T-SN by responding the request to cancel with a message. In other words, in this option a class 1 procedure of an inter-node control protocol (like XnAP) would be used for the cancelling of CPC from the MN to a target candidate SN.

(Step 12) The node operating as Master Node (MN) sends an RRCReconfiguration message to the UE (including the RRCReconfiguration* as the SCG RRC container), containing the new UE configuration where the previously configured CPC cells have been removed from the configuration within the RRCReconfiguration* in the SCG RRC container (in the case we assume that CPC is generated at the SN, as in Rel-16 CPC intra-node solution).

(Step 13) The UE completes the reconfiguration and informs the MN in an RRCReconfigurationComplete message.

(Step 14) The MN informs the S-SN that the UE reconfiguration is complete.

(Step 15) In this step the MN informs the T-SN in a new message that the UE reconfiguration is complete and that the T-SN may release the resources. The resources cannot be released in T-SN before the UE has been reconfigured, as the UE may otherwise try to access the T-SN in case the conditions are fulfilled before the CPC is removed in the UE. This case is new, as three different nodes are involved, with one node initiating the cancellation of the conditional reconfiguration, one node reconfiguring the UE and a third node having the resources reserved for the UE. For conditional handover, only two nodes are involved in the cancellation, the source node and the target node. This new message may also be sent in MN-initiated CPC, option A above.

Figure 13:
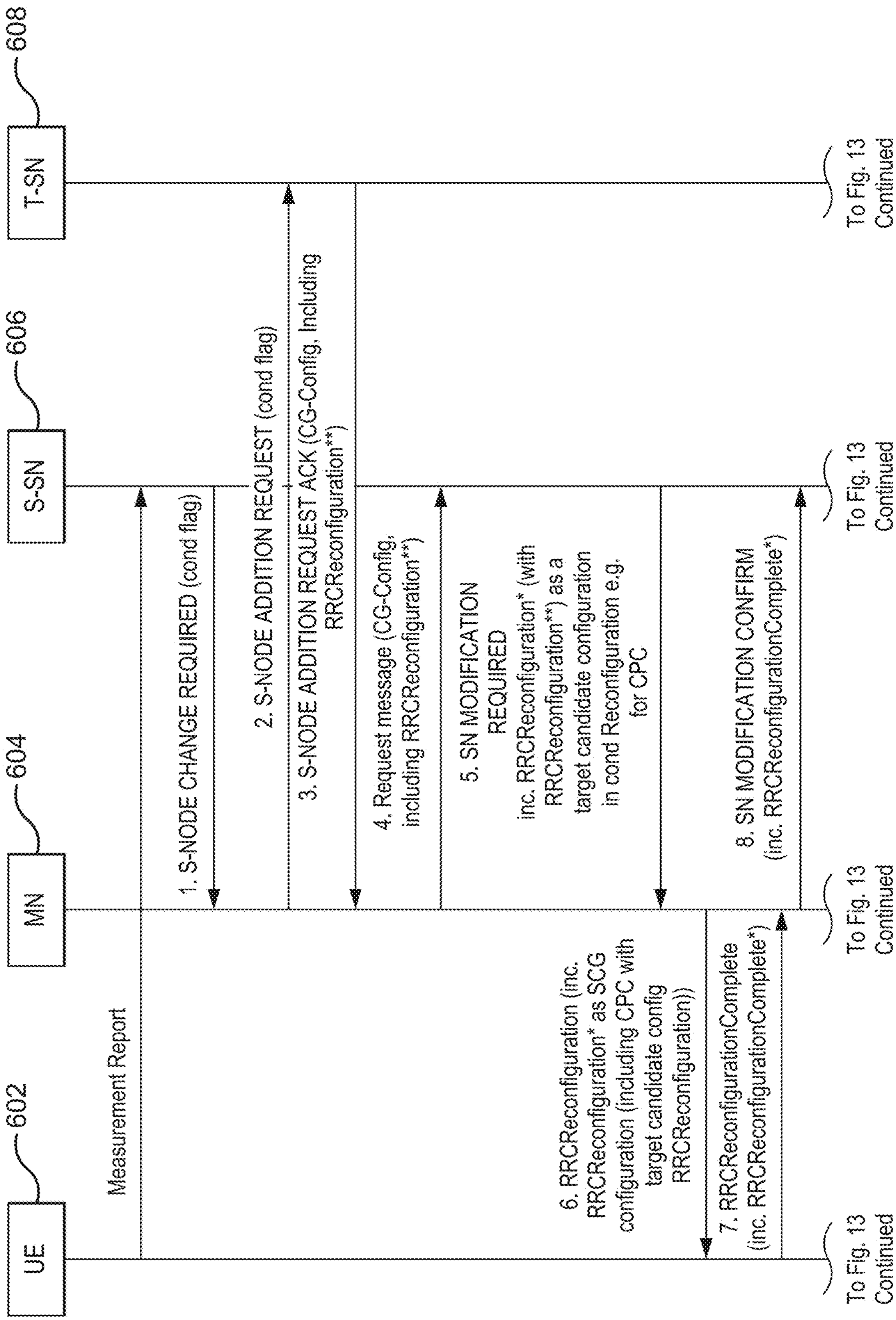
FIG. 13 is a message flow diagram illustrating an embodiment
Figure 13:
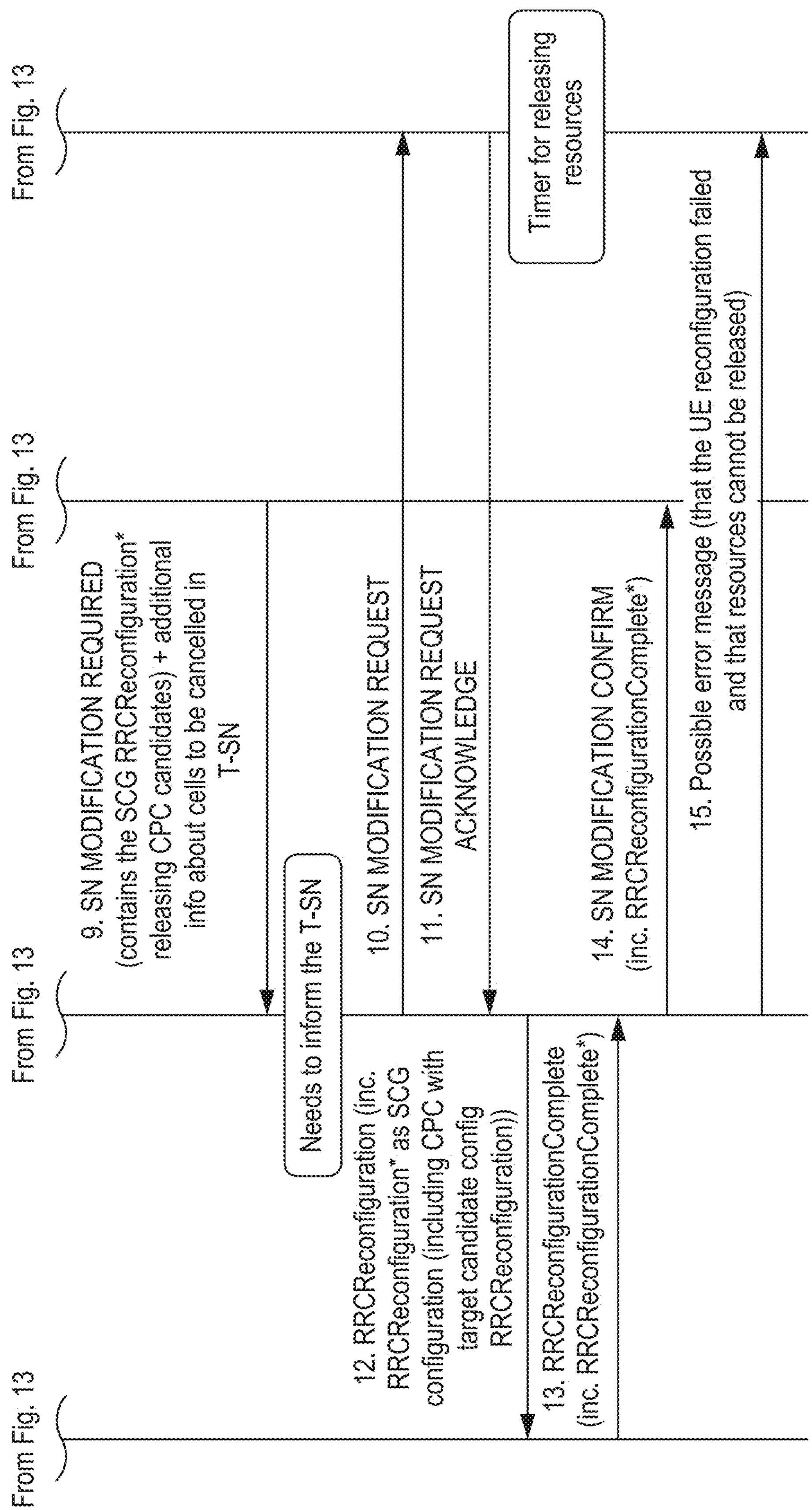

Option B3:

In this option, the S-SN cancels SN-initiated CPC, and UE reconfiguration is done after T-SN is informed. Also in this option, the S-SN initiates the configuration of conditional PSCell Change (CPC) and the final message sent to the UE with the conditional reconfiguration is built in S-SN. The message can be sent directly to the UE in case SRB3 is configured, otherwise the message is transferred to the MN, which forwards the message to the UE. Later, the S-SN decides to cancel the configuration of CPC. The reconfiguration of the UE is done after informing the T-SN about the cancellation. The difference compared to option B1 is that there is no message sent to the T-SN, informing it that the reconfiguration in the UE is completed. Instead an error message is sent in case the reconfiguration fails. Option B3 is illustrated in FIG. 13. The steps shown in FIG. 13 are described below.

(Step 1-8) contains the configuration of CPC with the S-SN building the reconfiguration message towards the UE where CPC is configured (RRCReconfiguration* as shown in the figure, in step 5, to be provided to the UE within an nr-scg field as a container within another RRCReconfiguration from the MN, as in step 6). The configuration may be done in a different way using different messages and/or different signalling flow, but it does not make any difference for this invention.

(Step 9) The node operating as Secondary Node (SN) sends a message including an indication of cancellation of target candidate cells (e.g. target candidate PSCells) to the MN.

The message to the MN contains an SCG RRCReconfiguration* message to be sent to the UE, releasing the CPC candidates. The message to the MN also includes information of which cells where CPC is cancelled, so that the MN can forward the release request to the correct target candidate SN. The information may e.g. be a list of cells or the ID of the conditional reconfiguration. In one option the message is an S-NODE MODIFICATION REQUIRED message including indication of cancellation of cells to the MN. In another option, an S-NODE RELEASE REQUIRED with a list of target candidate cells to be cancelled, or conditional reconfiguration IDs are sent from the S-SN.

(Step 10) The node operating as Master Node (MN) sends a message to a target candidate SN including an indication of cancellation of target candidate cells (e.g. target candidate PSCells) to at least one target candidate SN. Upon reception the target candidate SN determines which target candidate cells are to be cancelled/removed for CPC configuration.

In one option that message is an S-NODE MODIFICATION REQUEST message including indication of cancellation of cells to the T-SN e.g. a list of cells for which CPC configuration is to be cancelled. In one option that message is an S-NODE RELEASE REQUEST message including indication of cancellation of cells to the T-SN, e.g., a list of cells for which CPC configuration is to be cancelled. In another option, a new message, e.g., CPC CANCEL is sent to the target candidate SN.

(Step 11) In one option, the node operating as T-SN acknowledges the cancellation of CPC cells in the T-SN by responding the request to cancel with a message. In other words, in this option a class 1 procedure of an inter-node control protocol (like XnAP) would be used for the cancelling of CPC from the MN to a target candidate SN.

(Step 12) The node operating as Master Node (MN) sends an RRCReconfiguration message to the UE (including the RRCReconfiguration* as the SCG RRC container), containing the new UE configuration where the previously configured CPC cells have been removed from the configuration within the RRCReconfiguration* in the SCG RRC container (in the case we assume that CPC is generated at the SN, as in Rel-16 CPC intra-node solution).

(Step 13) The UE completes the reconfiguration and informs the MN in an RRCReconfigurationComplete message.

(Step 14) The MN informs the S-SN that the UE reconfiguration is complete.

(Step 15) In this step the MN informs the T-SN in a new message that the UE reconfiguration has failed and that the T-SN may not release the resources. The T-SN has likely kept the resourced for a while, possibly with a timer in the implementation, to ensure that the resources are not released too early. This new message may also be sent in MN-initiated CPC, option A above.

Figure 14:
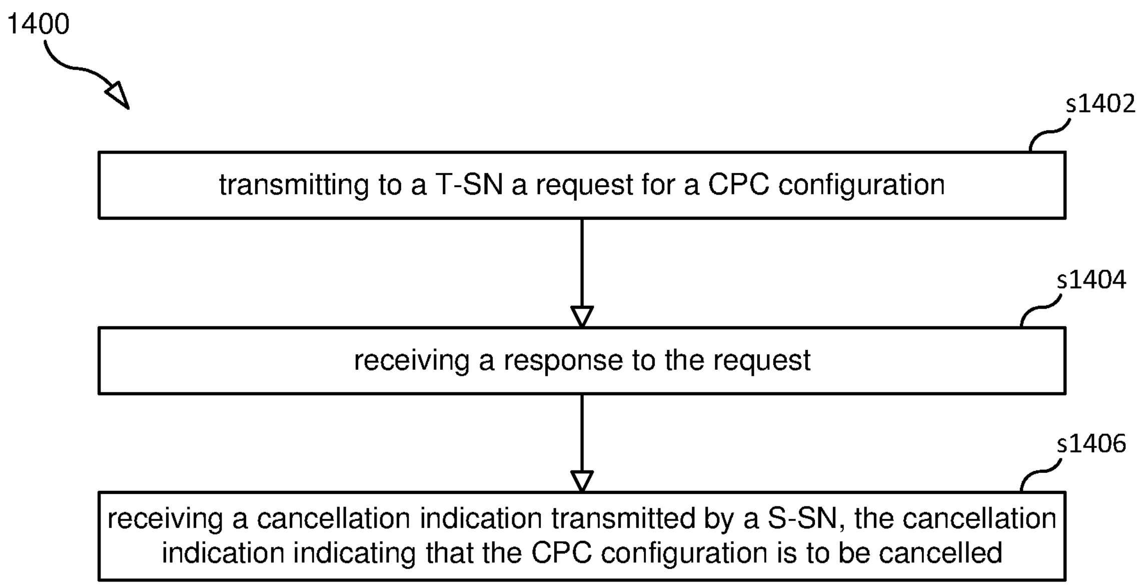
FIG. 14 is a flowchart illustrating a process according to an embodiment.

FIG. 14 is a flowchart illustrating a process 1400 performed by a MN 604 for cancellation of a CPC. Process 1400 may begin in step s1402. Step s1402 comprises transmitting to T-SN 608 a request for a CPC configuration. Step s1404 comprises receiving a response to the request. Step s1406 comprises receiving a cancellation indication transmitted by S-SN 606, the cancellation indication indicating that the CPC configuration is to be cancelled.

In some embodiments, wherein the cancellation indication transmitted by the S-SN comprises one of: an S-NODE MODIFICATION REQUIRED message, an S-NODE RELEASE REQUIRED message, a CPC CANCEL message, or a CHO CANCEL.

In some embodiments, process 1400 also includes releasing of resources associated with the CPC configuration that has been indicated to be cancelled and/or stopping a supervision timer.

In some embodiments, process 1400 also includes transmitting to the T-SN an indication that the CPC configuration is to be cancelled. In some embodiments, the indication transmitted to the T-SN comprises one of: an S-NODE MODIFICATION REQUEST message, a CPC CANCEL message, an SN ADDITION CANCEL message, or an S-NODE RELEASE REQUEST message.

In some embodiments, process 1400 also includes reconfiguring a UE to remove a conditional PSCell change associated with the S-SN.

In some embodiments, process 1400 also includes, prior to transmitting the request to the T-SN, receiving from the S-SN a request to configure CPC. In some embodiments, receiving the request transmitted by the S-SN comprises receiving one of: an S-NODE MODIFICATION REQUIRED message, or an S-NODE RELEASE REQUIRED message. In some embodiments, the request transmitted by the S-SN comprises information indicating the T-SN.

In some embodiments, transmitting the request to the T-SN to prepare the CPC configuration comprises transmitting to the T-SN an S-NODE ADDITION REQUEST message.

Figure 15:
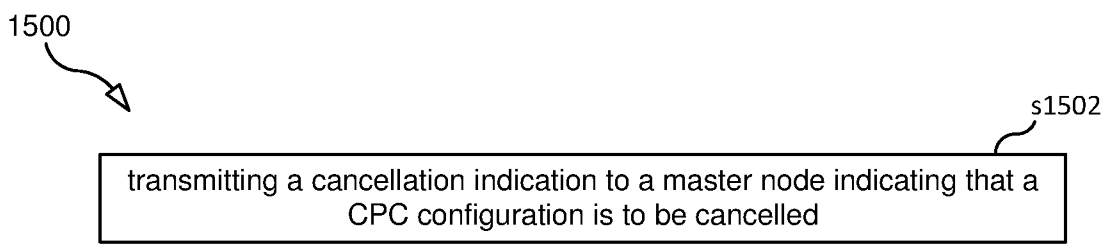
FIG. 15 is a flowchart illustrating a process according to an embodiment.

FIG. 15 is a flowchart illustrating a process 1500 performed by a S-SN 606 for cancellation of CPC. Process 1500 comprises a step s1502, in which S-SN 606 transmits a cancellation indication to MN 604 indicating that a configured CPC is to be cancelled.

In some embodiments, the cancellation indication comprises one of: an S-NODE MODIFICATION REQUEST message, an CPC CANCEL message, or an SN ADDITION CANCEL message.

In some embodiments, process 1500 also includes, prior to transmitting the cancellation indication to the MN, transmitting a request to the MN to prepare a CPC configuration; and receiving a response message transmitted by the MN. In some embodiments, the request comprises: an S-NODE MODIFICATION REQUIRED message, or an S-NODE RELEASE REQUIRED message. In some embodiments, the response transmitted by the MN is an S-NODE MODIFICATION CONFIRM message.

In some embodiments, the cancellation indication is transmitted as a result of: detecting that a UE has moved away from a candidate target cell, detecting that a Secondary Cell Group, SCG, is going to be deactivated or suspended, or detecting that a conditional hand over, CHO, needs to be configured.

Figure 16:
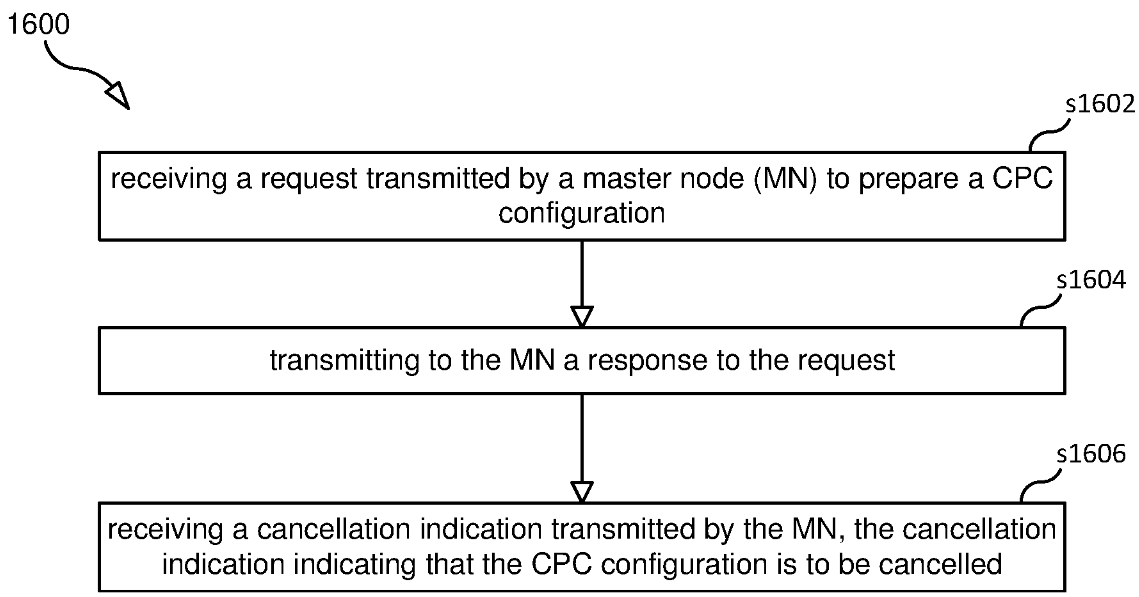
FIG. 16 is a flowchart illustrating a process according to an embodiment.

FIG. 16 is a flowchart illustrating a process 1600 performed by a T-SN 608 for cancellation of a CPC. Process 1600 may begin in step s1602. Step s1602 comprises receiving a request transmitted by MN 604 to prepare a CPC configuration. Step s1604 comprises transmitting to the MN a response to the request. Step s1606 comprises receiving a cancellation indication transmitted by the MN, the cancellation indication indicating that the CPC configuration is to be cancelled.

In some embodiments, the cancellation indication is one of: an S-NODE MODIFICATION REQUIRED message, an S-NODE RELEASE REQUIRED message, an S-NODE MODIFICATION REQUEST message, an S-NODE RELEASE REQUEST message, or a CPC CANCEL message.

In some embodiments, the request to prepare the CPC configuration comprises: a conditional PSCell Addition, an S-NODE MODIFICATION REQUIRED message, or an S-NODE RELEASE REQUIRED message.

In some embodiments, the response to the request to configure the CPC comprises: a conditional PSCell Addition Acknowledgement or an SN MODIFICATION REQUEST ACKNOWLEDGE message.

In some embodiments, process 1600 also includes acknowledging the cancellation of CPC cells to the MN. In some embodiments, acknowledging the cancellation of CPC cells comprises transmitting to the MN one of: an S-NODE MODIFICATION REQUEST ACKNOWLEDGE message or an S-NODE RELEASE REQUEST ACKNOWLEDGE message.

Figure 17:
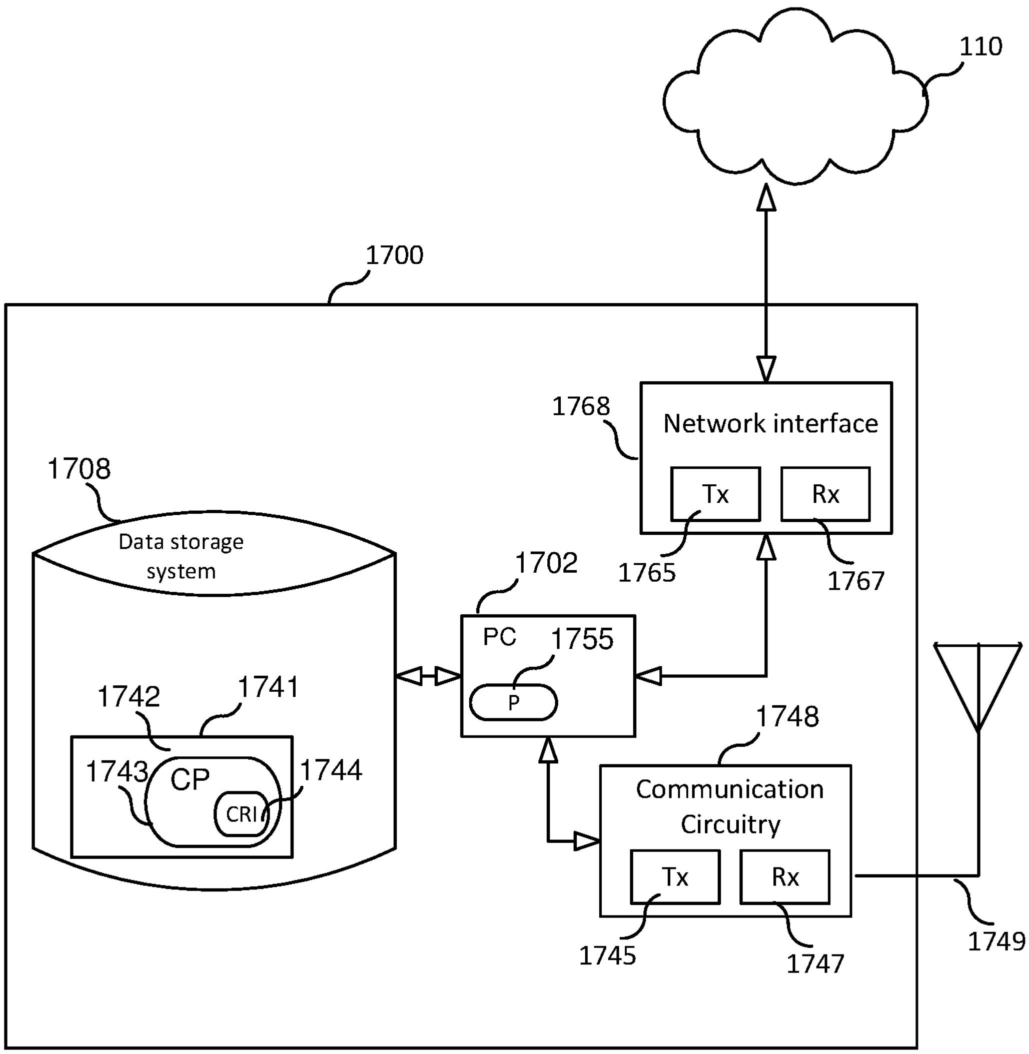
FIG. 17 is a block diagram of a network node according to an embodiment.

FIG. 17 is a block diagram of a network node 1700 (e.g., a base station or a component of a base station), according to some embodiments, for performing the methods disclosed herein. That is network node may implement MN 604, S-SN 606, or T-SN 608. As shown in FIG. 17, network node 1700 may comprise: processing circuitry (PC) 1702, which may include one or more processors (P) 1755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node may be a distributed computing apparatus); a network interface 1768 comprising a transmitter (Tx) 1765 and a receiver (Rx) 1767 for enabling network node 1700 to transmit data to and receive data from other nodes connected to a network 110 (e.g., an Internet Protocol (IP) network) to which network interface 1768 is connected; communication circuitry 1748 (e.g., radio transceiver circuitry comprising an Rx 1747 and a Tx 1745) coupled to an antenna system 1749 for wireless communication with UEs or other nodes); and a local storage unit (a.k.a., "data storage system") 1708, which may include one or more non-volatile storage devices and/or one or more volatile storage devices. In embodiments where PC 1702 includes a programmable processor, a computer program product (CPP) 1741 may be provided. CPP 1741 includes a computer readable medium (CRM) 1742 storing a computer program (CP) 1743 comprising computer readable instructions (CRI) 1744. CRM 1742 may be a non-transitory computer readable medium, such as, magnetic media (e.g., a hard disk), optical media, memory devices (e.g., random access memory, flash memory), and the like. In some embodiments, the CRI 1744 of computer program 1743 is configured such that when executed by PC 1702, the CRI causes network node 1700 to perform steps described herein (e.g., steps described herein with reference to one or more flow charts). In other embodiments, network node 1700 may be configured to perform steps described herein without the need for code. That is, for example, PC 1702 may consist merely of one or more ASICs. Hence, the features of the embodiments described herein may be implemented in hardware and/or software.

Figure 18:
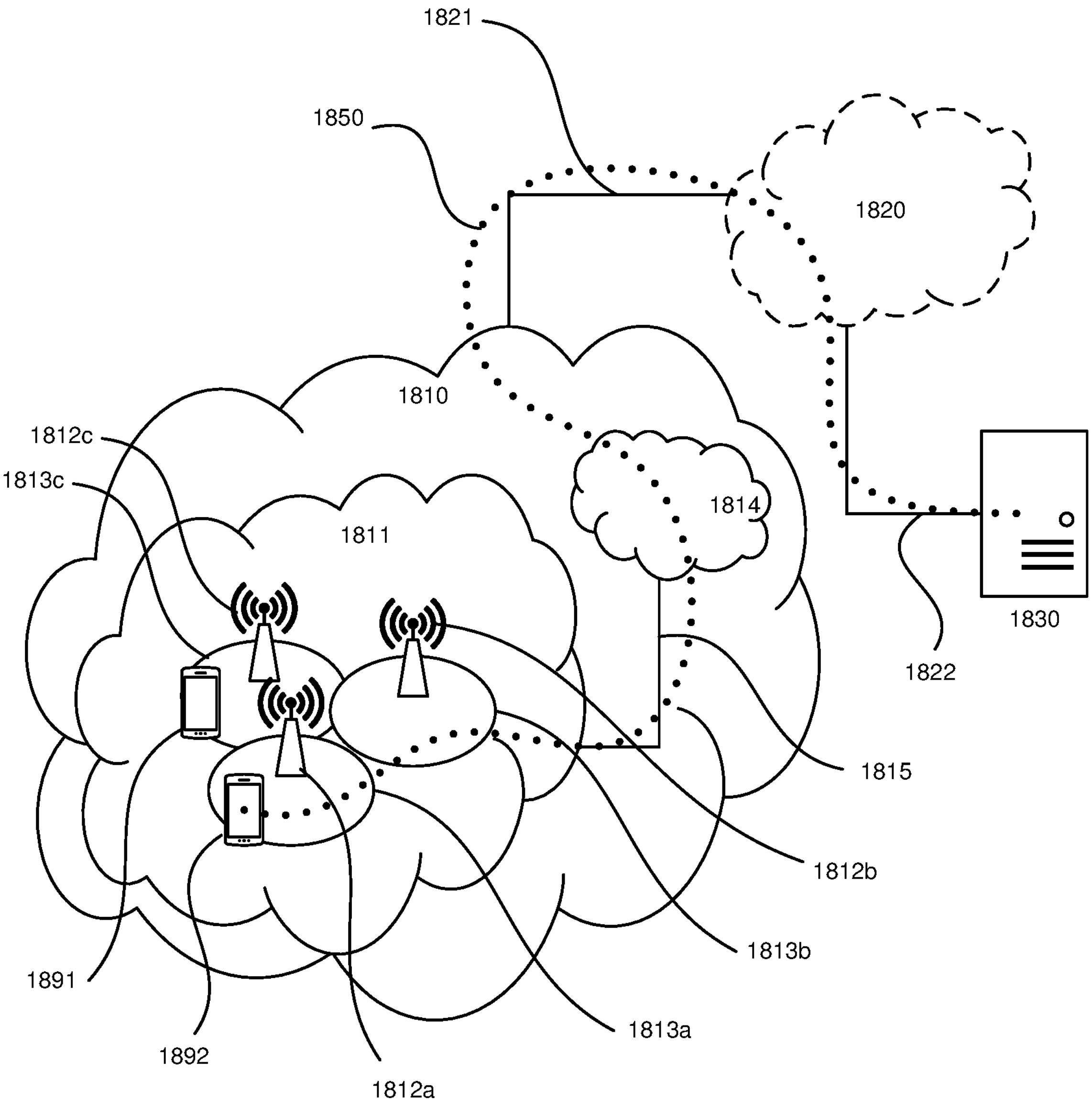
FIG. 18 illustrates a system according to an embodiment.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations **1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to core network 1814 over a wired or wireless connection 1815. A first UE 1891 located in coverage area 1813***c* is configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

Figure 19:
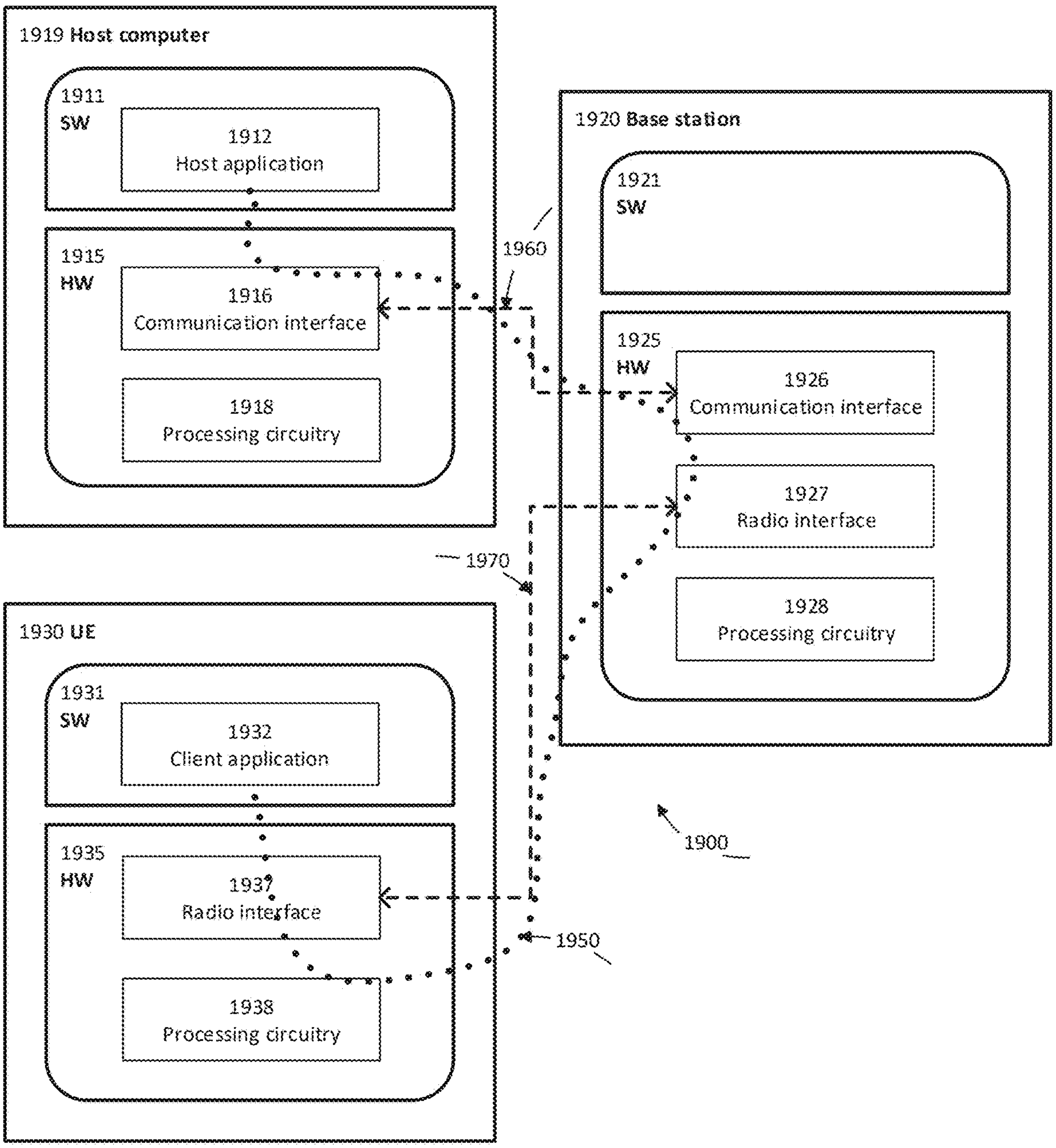
FIG. 19 illustrates a host computer communicating via a base station with a user equipment over a partially wireless connection in accordance with an embodiment.

It is noted that host computer 1910, base station 1920 and UE 1930 illustrated in FIG. 19 may be similar or identical to host computer 1830, one of base stations 1812*a*, 1812*b*, 1812*c* and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve one or more of the date rate, latency, and power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
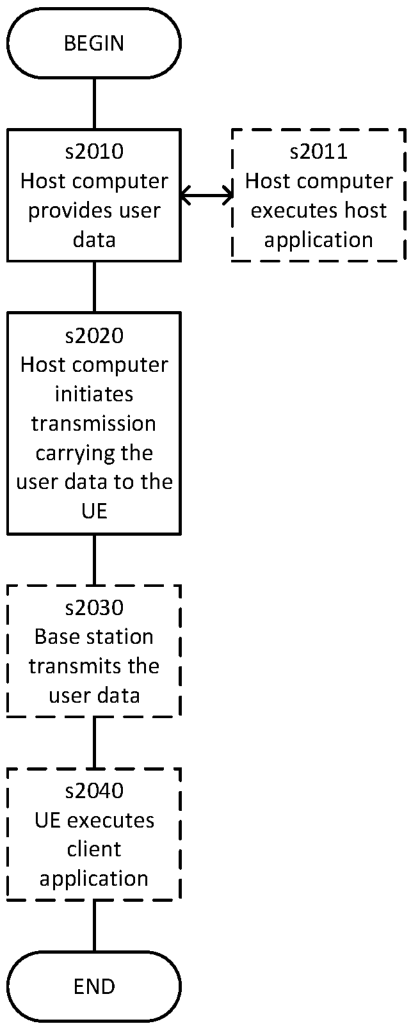
FIG. 20 is a flowchart illustrating a process according to an embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
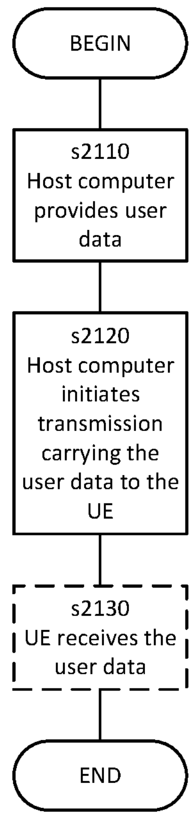
FIG. 21 is a flowchart illustrating a process according to an embodiment.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
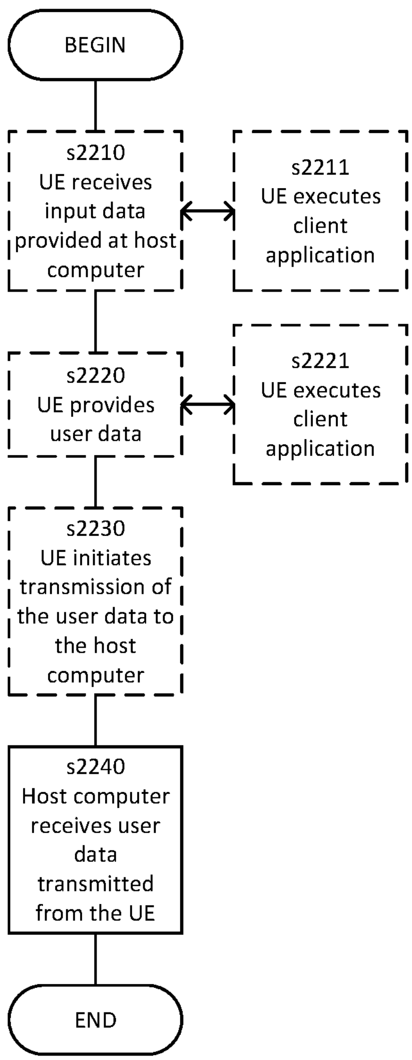
FIG. 22 is a flowchart illustrating a process according to an embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
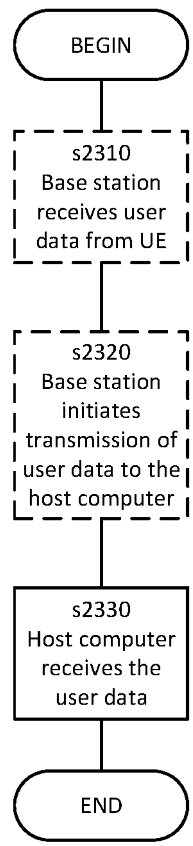
FIG. 23 is a flowchart illustrating a process according to an embodiment.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

SUMMARY OF ADDITIONAL EMBODIMENTS

1. A method performed by a base station operating as a master node (MN) for source secondary node initiated cancel of conditional PSCell change (CPC), the method comprising: transmitting a request to a T-SN to configure conditional PSCell change; receiving a response to the request confirming that a UE may be accepted; receiving a cancellation indication from the S-SN indicating that a previously provided conditional PSCell change configuration is to be cancelled; transmitting an indication to a target candidate SN that a configured conditional PSCell change is to be cancelled; and reconfiguring a UE to remove a conditional PSCell change associated with the SN that has sent the cancelling indication for at least one target candidate PSCell.
2. The method of embodiment 1, wherein the cancellation indication comprises one of an S-NODE MODIFICATION REQUIRED message, an S-NODE RELEASE REQUIRED message, a CPC CANCEL message, and a CHO CANCEL.
3. The method of any of the above embodiments, further comprising performing one or more actions upon receiving the cancelling indication, including one or more of releasing of resources associated with the CPC that has been indicated to be cancelled and stopping a supervision timer.

The method of any of the above embodiments, and further comprising sending an indication to a determined target candidate SN that CPC is to be cancelled.

5. The method of any of the above embodiments, wherein the indication to the determined target candidate is one of an S-NODE MODIFICATION REQUEST message, a CPC CANCEL message, and an SN ADDITION CANCEL message.
6. A method performed by a base station operating as a source secondary node (S-SN) for source secondary node initiated cancel of conditional PSCell change (CPC), the method comprising: transmitting a cancellation indication to a master node indicating that a configured conditional PSCell change is to be cancelled.
7. The method of embodiment 6, wherein the transmitted indication comprises one of an S-NODE MODIFICATION REQUEST message, an CPC CANCEL message, and an SN ADDITION CANCEL message.
8. A method performed by a base station operating as a target candidate secondary node (T-SN) for source secondary node initiated cancel of conditional PSCell change (CPC), the method comprising: receiving a request from a master node (MN) to configure a CPC; transmitting a response to the request to the MN to configure the CPC; and receiving a cancellation indication from the MN indicating that a configured conditional PSCell change is to be cancelled.
9. The method of embodiment 8, wherein the cancellation indication is one of a S-NODE MODIFICATION REQUIRED message and a S-NODE RELEASE REQUIRED message.
10. The method of any of the above two embodiments, wherein the request to configure a CPC comprises a conditional PSCell Addition.
11. The method of any of embodiments 8-10, wherein the response to the request to configure a CPC comprises a conditional PSCell Addition Ack.
12. The method of embodiment 8, further comprising acknowledging the cancellation of CPC cells to the MN.
13. The method of embodiment 12, wherein acknowledging the cancellation of CPC cells further comprises transmitting to the MN one an S-NODE MODIFICATION REQUEST ACKNOWLEDGE message and an S-NODE RELEASE REQUEST ACKNOWLEDGE message.
14. A method performed by a base station operating as a source secondary node (S-SN) for source secondary node initiated cancel of conditional PSCell change (CPC), the method comprising: transmitting a request to a master Node (MN) to prepare a conditional PSCell change; receiving from the MN a response to the conditional SN reconfiguration request confirming that a UE may be accepted; and transmitting a cancellation indication to the MN indicating that a previously provided conditional SN addition configuration is not valid.
15. The method of embodiment 14, wherein the request comprises an S-NODE MODIFICATION REQUIRED message or an S-NODE RELEASE REQUIRED message.
16. The method of any of the previous two embodiments, wherein the response from the MN is an S-NODE MODIFICATION CONFIRM message.
17. The method of embodiment previous three embodiments, wherein the previously provided conditional SN addition configuration is not valid because the UE has moved away from a candidate target cell and that a CPC is not likely anymore or that the SCG is going to be deactivated or suspended or that CHO needs to be configured.
18. A method performed by a base station operating as a master node (MN) for source secondary node initiated cancel of conditional PSCell change (CPC), the method comprising: receiving a request from a S-SN to configure conditional PSCell change; transmitting a request to a T-SN (target candidate) to configure conditional PSCell change; receiving a response to the conditional reconfiguration request, confirming that a UE may be accepted; receiving a cancellation indication from a S-SN indicating that a previously provided conditional PSCell change configuration is to be cancelled; transmitting a request to a T-SN that a previously provided conditional PSCell change configuration is to be cancelled; and reconfiguring a UE to cancel or update a conditional PSCell change associated with the SN that has sent the cancelling indication.
19. The method of the previous embodiment, wherein receiving a request from a S-SN to configure conditional PSCell change comprises receive one of an S-NODE MODIFICATION REQUIRED message and an S-NODE RELEASE REQUIRED message.
20. The method of any of the previous two embodiments, wherein transmitting a request to a T-SN that a previously provided conditional PSCell change configuration is to be cancelled comprises transmitting one of an S-NODE MODIFICATION REQUEST message, an S-NODE RELEASE REQUEST message, and an CPC CANCEL message.
21. The method of any of the previous three embodiments, wherein transmitting a request to a T-SN (target candidate) to configure conditional PSCell change comprises transmitting an S-NODE MODIFICATION CONFIRM message.

22. The method of any of the previous four embodiments, further comprising performing one or more actions, upon receiving the cancelling indications, including releasing of resources associated with the CPC that has been indicated to be cancelled and stopping supervision of a timer.

23. A method performed by a base station operating as a target candidate secondary node (T-SN) for source secondary node initiated cancel of conditional PSCell change (CPC), the method comprising: receiving a request from a master node (MN) to configure CPC; transmitting a response to the request to the MN to configure CPC; and receiving a cancellation indication from the MN indicating that a configured conditional PSCell change is to be cancelled.

24. The method of the previous embodiment, wherein the request comprises an S-NODE MODIFICATION REQUIRED message or an S-NODE RELEASE REQUIRED message.

25. The method of any of the previous two embodiments, wherein the response comprises an SN MODIFICATION REQUEST ACKNOWLEDGE message.

26. The method of any of the previous three embodiments, wherein the cancellation indication from the MN indicating that a configured conditional PSCell change is to be cancelled comprises one of an S-NODE MODIFICATION REQUEST message, and S-NODE RELEASE REQUEST, message, and a CPC CANCEL message.

27. The method of any of the previous four embodiments, wherein receiving a request comprises receiving a conditional PSCell Addition.

28. The method of any of the previous four embodiments, wherein receiving a response to the request comprises receiving a conditional PSCell Addition Ack.

29. The method of any of the previous embodiments, further comprising: obtaining user data; and forwarding the user data to a host computer or a wireless device.

30. A base station for source secondary node initiated cancel of conditional PSCell change (CPC), the base station comprising: processing circuitry and power supply circuitry configured to supply power to the base station, wherein the processing circuitry I configured to perform any of the steps of any of embodiments 1-29.

31. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the embodiments 1-29.

32. The communication system of the previous embodiment further including the base station.

33. The communication system of the previous 2 embodiments, further including the UE, wherein the UE is configured to communicate with the base station.

34. The communication system of the previous 3 embodiments, wherein: the processing circuitry of the host computer is configured to execute a host application, thereby providing the user data; and the UE comprises processing circuitry configured to execute a client application associated with the host application.

35. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the embodiments 1-29.

36. The method of the previous embodiment, further comprising, at the base station, transmitting the user data.

37. The method of the previous 2 embodiments, wherein the user data is provided at the host computer by executing a host application, the method further comprising, at the UE, executing a client application associated with the host application.

38. A user equipment (UE) configured to communicate with a base station, the UE comprising a radio interface and processing circuitry configured to performs the of the previous 3 embodiments.

39. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the embodiments 1-29.

40. The communication system of the previous embodiment further including the base station.

41. The communication system of the previous 2 embodiments, further including the UE, wherein the UE is configured to communicate with the base station.

42. The communication system of the previous 3 embodiments, wherein: the processing circuitry of the host computer is configured to execute a host application; the UE is configured to execute a client application associated with the host application, thereby providing the user data to be received by the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A method performed by a source secondary node (S-SN) for cancellation of a conditional primary secondary cell (PSCell) change, the method comprising:

detecting that i) a Secondary Cell Group (SCG) is going to be deactivated or suspended and/or ii) a conditional hand over (CHO) needs to be configured; and transmitting a cancellation indication to a master node (MN) indicating that a configured conditional PSCell change (CPC) is to be cancelled, wherein the cancellation indication is transmitted as a result of:
detecting that the SCG is going to be deactivated or suspended, or
detecting that the CHO needs to be configured.

2. The method of claim 1, wherein the cancellation indication comprises:
an S-NODE MODIFICATION REQUEST message,
an CPC CANCEL message, or
an SN ADDITION CANCEL message.

3. The method of claim 1, further comprising:
prior to transmitting the cancellation indication to the MN, transmitting a request to the MN to prepare a CPC configuration; and receiving a response message transmitted by the MN.

4. The method of claim 3, wherein the request comprises:
an S-NODE MODIFICATION REQUIRED message, or
an S-NODE RELEASE REQUIRED message.

5. The method of claim 3, wherein the response transmitted by the MN is an S-NODE MODIFICATION CONFIRM message.

6. The method of claim 1, wherein the method comprises detecting that the SCG is going to be deactivated or suspended, and the cancellation indication is transmitted as a result of detecting that the SCG is going to be deactivated or suspended.

* * * * *